(12) United States Patent
Oikawa et al.

(10) Patent No.: US 10,255,533 B2
(45) Date of Patent: Apr. 9, 2019

(54) INFORMATION DEVICE, COMPUTER-READABLE STORAGE MEDIUM FOR COMPUTER PROGRAM, AND METHOD FOR SHARING MEMORY

(71) Applicant: Konica Minolta, Inc., Tokyo (JP)

(72) Inventors: Takashi Oikawa, Aichi (JP); Tomoyuki Atsumi, Aichi (JP); Takanobu Sugiyama, Toyokawa (JP); Tatsuya Kitaguchi, Toyokawa (JP)

(73) Assignee: Konica Minolta, Inc., Tokyo (JP)

( * ) Notice: Subject to any disclaimer, the term of this patent is extended or adjusted under 35 U.S.C. 154(b) by 75 days.

(21) Appl. No.: 14/611,786

(22) Filed: Feb. 2, 2015

(65) Prior Publication Data

US 2015/0220825 A1    Aug. 6, 2015

(30) Foreign Application Priority Data

Feb. 3, 2014 (JP) ................. 2014-018640

(51) Int. Cl.
*G06K 15/00* (2006.01)
*G06F 3/12* (2006.01)
(Continued)

(52) U.S. Cl.
CPC ......... *G06K 15/401* (2013.01); *G06F 3/1215* (2013.01); *G06F 3/1229* (2013.01); *G06F 3/1237* (2013.01); *G06F 3/1248* (2013.01); *G06F 3/1298* (2013.01); *G06K 15/1806* (2013.01); *G06K 15/1836* (2013.01); *G06K 15/1848* (2013.01); *G06K 15/1857* (2013.01);
(Continued)

(58) Field of Classification Search
CPC ............. G06K 15/401; G06K 15/1836; G06K 15/1806; G06K 15/1857; G06K 15/1848; H04N 1/32593; H04N 1/32448; H04N 2201/0094; G06F 3/1298; G06F 3/1248; G06F 3/1215; G06F 3/1237; G06F 3/1229
USPC ...................... 358/1.15–1.17; D17/1.15–1.17
See application file for complete search history.

(56) References Cited

U.S. PATENT DOCUMENTS 6,870,634 B1 *  3/2005  Morikawa .......... H04N 1/00681
                                                       358/1.15
8,462,376 B2 *  6/2013  Shiokawa .......... H04N 1/32122
                                                       358/1.16
(Continued)

FOREIGN PATENT DOCUMENTS

JP    2012-185704 A    9/2012

*Primary Examiner* — Kent Yip
(74) *Attorney, Agent, or Firm* — Osha Liang LLP

(57) ABSTRACT

A device includes a first processing portion configured to keep a memory region to perform a first process; a second processing portion configured to perform any one of a plurality of second processes by using a memory region provided by the first processing portion; and a predicting portion configured to predict a first size of a first memory region to be required next to a second memory region which is required at present by the second processing portion. The second processing portion requests, from the first processing portion, a memory region having at least a larger size of the first size and a second size of the second memory region. In response to the request, the first processing portion provides the second processing portion with a memory region which is a part of the memory region kept and is of a size requested by the second processing portion.

17 Claims, 20 Drawing Sheets

(51) Int. Cl.
  *G06K 15/02* (2006.01)
  *H04N 1/32* (2006.01)
(52) U.S. Cl.
  CPC ..... *H04N 1/32448* (2013.01); *H04N 1/32593* (2013.01); *H04N 2201/0094* (2013.01)

(56) References Cited

U.S. PATENT DOCUMENTS

| | | | |
|---|---|---|---|
| 2007/0121161 A1* | 5/2007 | Yamada | H04N 1/00954 358/1.16 |
| 2009/0086271 A1* | 4/2009 | Shiokawa | H04N 1/32122 358/1.16 |
| 2012/0233624 A1 | 9/2012 | Niimura | |

* cited by examiner

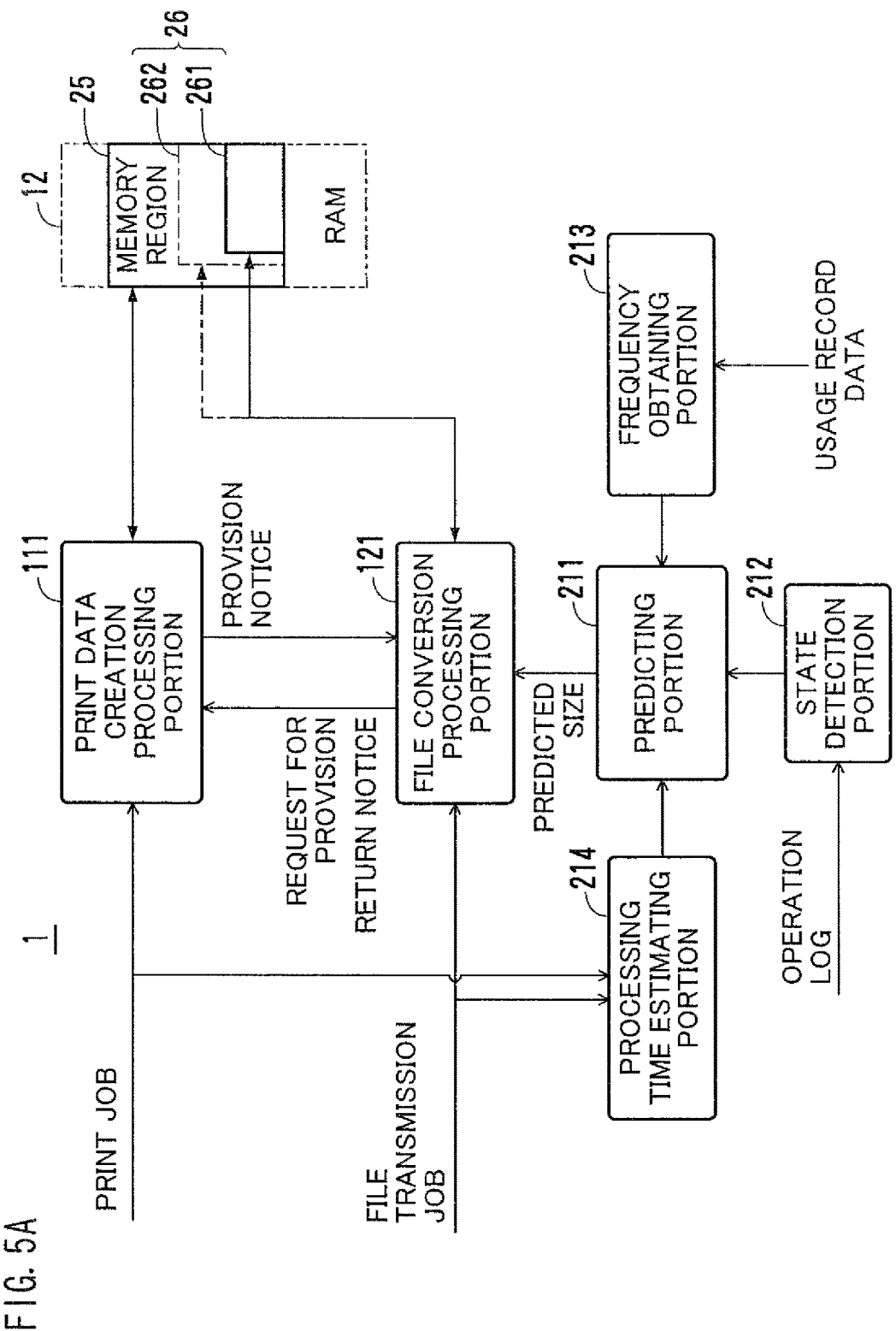

FIG. 8

TRANSFER SETTING LIST — 70

| No. | SENDER | TYPE | TRANSFER DESTINATION |
|---|---|---|---|
| 1 | 123456789 | FTP | xxx.xxx.xxx.xxx |
| 2 | 5678901234 | Email | XXX@email.com |
| 3 | ZZZ@email.com | FAX | 0987654321 |
| 4 | aaa.bbb.ccc.ddd | Box | Box-001 |
| 5 | 1122334455 | I-FAX | MFP-001 |

[PREVIOUS PAGE] [NEXT PAGE] — 73  [EDIT] [DELETE]

LIST OF JOBS CURRENTLY EXECUTED

| No. | TYPE | DOCUMENT NAME/DESTINATION | TIME | NUMBER OF SHEETS | STATE |
|---|---|---|---|---|---|
| 1 | PRINT | 0987654321 | 14:28 | 15/30 | PRINTING |
| 2 | I-FAX TRANSMISSION | MFP-001 | 14:29 | 2/20 | SENDING |
| 3 | NET TRANSMISSION | ZZZ@email.com | 14:30 | 0/30 | SEND QUEUE |
| 4 | NET TRANSMISSION | xxx.xxx.xxx.xxx | 14:31 | 0/20 | SEND QUEUE |
| 5 | COPY | COPY | 14:32 | 0/15 | PRINTING QUEUE |

[PREVIOUS PAGE] [NEXT PAGE] [STOP] [DELETE] [DETAILS]

(B)

80b

LIST OF JOBS CURRENTLY EXECUTED

| No. | TYPE | DOCUMENT NAME/DESTINATION | TIME | NUMBER OF SHEETS | STATE |
|---|---|---|---|---|---|
| 3 | NET TRANSMISSION | ZZZ@email.com | 14:30 | 2/30 | SENDING |
| 4 | NET TRANSMISSION | xxx.xxx.xxx.xxx | 14:31 | 0/20 | SEND QUEUE |
| 5 | COPY | COPY | 14:32 | 5/15 | PRINTING |

[PREVIOUS PAGE] [NEXT PAGE] [STOP] [DELETE] [DETAILS]

INFORMATION DEVICE, COMPUTER-READABLE STORAGE MEDIUM FOR COMPUTER PROGRAM, AND METHOD FOR SHARING MEMORY

This application is based on Japanese patent application No. 2014-018640 filed on Feb. 3, 2014, the contents of which are hereby incorporated by reference.

BACKGROUND OF THE INVENTION

1. Field of the Invention

The present invention relates to a technology for performing a plurality of processes in parallel with one another using a memory.

2. Description of the Related Art

Multi-functional Peripherals (MFPs) that are composite information devices are used for office work. Such an MFP acts as a copier, printer, network scanner, facsimile machine, or document server depending on what kind of job is instructed by a user. The MFP has installed therein firmware for implementing a variety of operations.

A processor contained in the MFP uses a Random Access Memory (RAM) as a work area to execute, depending on a job, a module of the firmware. Among a variety of processes performed by the processor, both a Raster Image Processor (RIP) process and a file conversion process involve a large work area.

The RIP process is to convert, in a print job for which the MFP acts as a printer, a page image described in a page description language to a raster image suitable for printing. The file conversion process is to convert, in a file transmission job for which the MFP acts as, for example, a document server, the format of a file to be sent to any one of options such as Portable Document Format (PDF), compact PDF, TIFF, and JPEG.

The size of a work area required for the file conversion process depends on the post-conversion file format. For example, the size of a work area required for the file conversion process is larger in the case of conversion into compact PDF than in the case of conversion into PDF. For the file conversion into compact PDF, data on the entire page is imported once on a page-by-page basis for compression on a per-region basis to further reduce a file size. Therefore, the file conversion into compact PDF needs a work area larger than that in the file conversion into PDF.

The MFP sometimes performs print operation and file transmission operation in parallel with each other. For example, when a file transmission job is entered during execution of a print job, the MFP starts the file transmission operation without waiting for the print operation to be completed. In such a case, both the RIP process for printing and the file conversion process for file transmission involve using, as work areas, memory regions of the RAM reserved respectively for the RIP process and the file conversion process.

Concerning the use of a memory in an MFP, as a method for the case where a plurality of application programs share a memory space, a method has been proposed by which any of the application programs is stopped when the memory usage exceeds a threshold (Japanese Laid-open Patent Publication No. 2012-185704). The method prevents the application programs from running incorrectly due to insufficient memory.

Conventional information devices need to mount a RAM thereon which has a memory region larger than the total size of work areas required for processes performed in parallel with one another. This is because separate memory regions of a memory are to be allocated to the processes performed in parallel with one another. The total size of the work areas is larger, a RAM is required which is greater in memory size and price.

According to the foregoing conventional method, when an application program is stopped, a process corresponding to the application program halts, which reduces the performance (processing speed) of the process to zero (0). The process cannot restart until another process is completed. Therefore, a job involving the halted process requires long time.

SUMMARY

The present disclosure has been achieved in light of such an issue, and therefore, an object of an embodiment of the present invention is to achieve predetermined performance of a plurality of processes involving the use of a memory.

According to one aspect of the present invention, an information device performing a plurality of processes involving using a memory as a work area in parallel with one another is provided. The information device includes a first processing portion configured to keep a memory region of the memory to perform a first process; a second processing portion configured to perform any one of a plurality of second processes by using a memory region provided by the first processing portion; and a predicting portion configured to predict a size of a memory region to be required next to a memory region which is required at this point in time by the second processing portion; wherein, when the second processing portion performs said any one of the plurality of second processes, the second processing portion makes a request to the first processing portion to provide a memory region having at least a larger size of the size predicted by the predicting portion and a size of the memory region which is required at the point in time, and, in response to the request from the second processing portion, the first processing portion provides the second processing portion with a memory region which is a part of the memory region kept and is of a size requested by the second processing portion.

These and other characteristics and objects of the present invention will become more apparent by the following descriptions of preferred embodiments with reference to drawings.

BRIEF DESCRIPTION OF THE DRAWINGS

FIGS. 5A-5C are diagrams showing an example of the functional configuration of main portions involving shared use of a memory in an MFP.

FIG. 8 is a diagram showing an example of a transfer setting list screen.

FIG. 9 is a diagram showing examples of a job list screen.

DESCRIPTION OF THE PREFERRED EMBODIMENTS

In this description, an MFP is taken as an example of an information device according to an embodiment of the present invention. The MFP is a composite information device into which functions useful for office work are consolidated.

Figure 1:
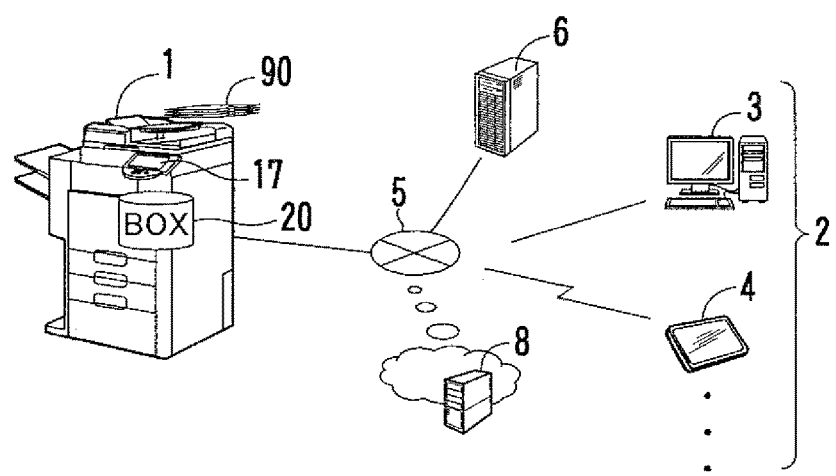
FIG. 1 is a diagram showing an example of a network having an MFP according to an embodiment of the present invention.

Referring to FIG. 1, an MFP 1 is connected to a Local Area Network (LAN) 5 constructed in a corporate office and is shared by users. The LAN 5 is connected to one or more user terminals 2 and another information device. As shown in FIG. 1, examples of the user terminal 2 are a desktop personal computer 3 and a tablet 4, and an example of another information device is a server machine 6. The MFP 1 is configured to perform communication with the information devices of the LAN 5 and with information devices over the Internet, e.g., a cloud server 8. The MFP 1 is also configured to perform facsimile communication over a public telephone line (not shown).

The MFP 1 has a printing function and a data transmission function. To be specific, the MFP 1 prints onto paper, depending on an instructed job, a scanned image read out from a document sheet 90, a document sent from an external device, a document stored in a box 20 of the MFP 1, or an image received via facsimile communication. The MFP 1 saves the scanned image to the box 20, or converts the scanned image or a document in the box 20 into a predetermined format to transfer the resultant to an external device. The data transmission to the external device includes an e-mail transmission of attaching data to an e-mail message and a facsimile transmission.

The MFP 1 is given a job in response to operation with the use of an operating panel 17 of the MFP 1 (direct operation) or in response to a remote access connection with the use of a user terminal. The MFP 1 receives a job entered by one or more logged-in users who has logged onto the MFP 1 by performing predetermined operation. For example, while a user causes the MFP 1 to send a scanned image of the document sheet 90 to the personal computer 3, another user accesses the MFP 1 from the tablet 4 to enter a job, into the MFP 1, of sending a document saved in the box 20 to the tablet 4. It is common for a plurality of logged-in users to access the MFP 1 from remote locations.

In response to entry of jobs one after another into the MFP 1 by logged-in users, the MFP 1 executes the jobs one after another. Supposing that, during a job is executed, another job is entered into the MFP 1. If parallel execution of the jobs is possible by the MFP 1, then the MFP 1 does not wait for completion of the job being executed, and starts execution of the next job. For example, the MFP 1 can execute a copy job of printing a scanned image in parallel with a file transmission job of transferring a document saved in the box 20 to an external device.

Figure 2:
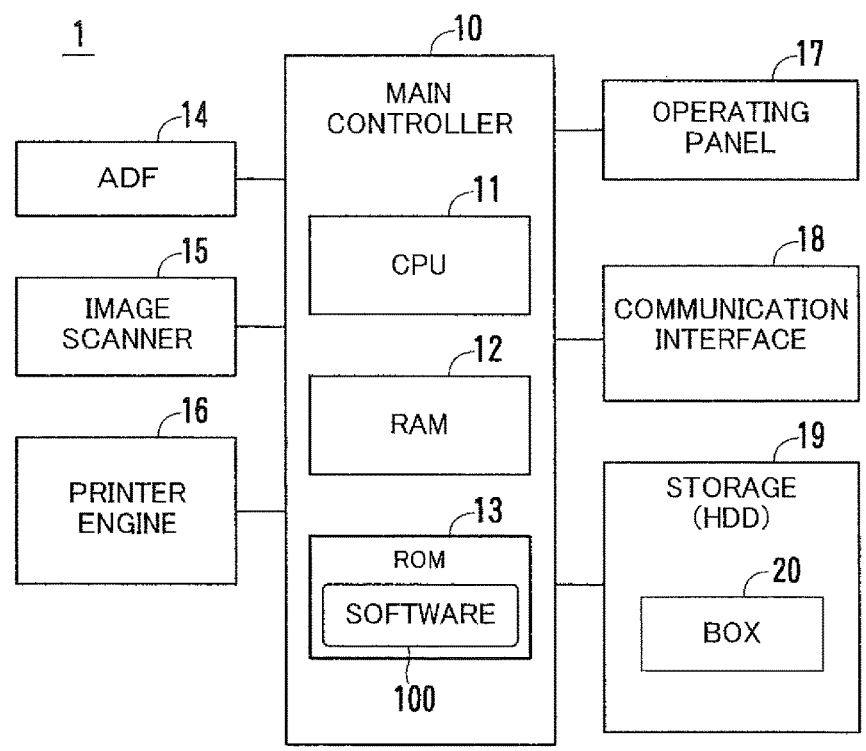
FIG. 2 is a diagram showing an example of the hardware configuration of an MFP.

FIG. 2 is a diagram showing an example of the hardware configuration of the MFP 1.

An Auto Document Feeder (ADF) 14 feeds a document sheet placed by a user to a scan position of an image scanner 15. The image scanner 15 optically reads an image recorded on the document sheet. In the case of copying, printing, or facsimile transmission, a printer engine 16 is operable to print an image onto paper through electrophotography. The print method may be an inkjet method or any other methods.

The operating panel 17 is provided with a display and a touch-sensitive panel. The display is, for example, a liquid crystal panel. The touch-sensitive panel is configured to detect a touch action on a display surface of the display to output a signal indicating the touched position. The touch-sensitive panel of the operating panel 17 is configured to detect a flick gesture and a multi-touch gesture.

A communication interface 18 enables communication between the MFP 1 and an external device. The communication interface 18 includes a Network Interface Card (NIC) for connecting the MFP 1 to the LAN 5 for communication and a modem for facsimile communication via the public telephone line. Data communication through the communication interface 18 is controlled by a network controller of a main controller 10.

A storage 19 is, for example, a hard disk drive. The storage 19 is used to store application programs and settings data, and to temporarily store data for data processing. A box 20 is a nonvolatile memory region for document saving provided in the storage 19. The box 20 is sectioned into regions, e.g., a personal box (also called a user box) used personally by each user and a common box shared by users.

The main controller 10 serves to control an overall operation of the MFP 1. The main controller 10 has a Central Processing Unit (CPU) 11 acting as a computer for executing a variety of programs, a Random Access Memory (RAM) 12 used as a work area for program execution, a Read Only Memory (ROM) 13 for storing programs and control data therein, and so on. The ROM 13 stores therein software 100 including an installed program for implementing the wide variety of functions of the MFP 1.

Figure 3:
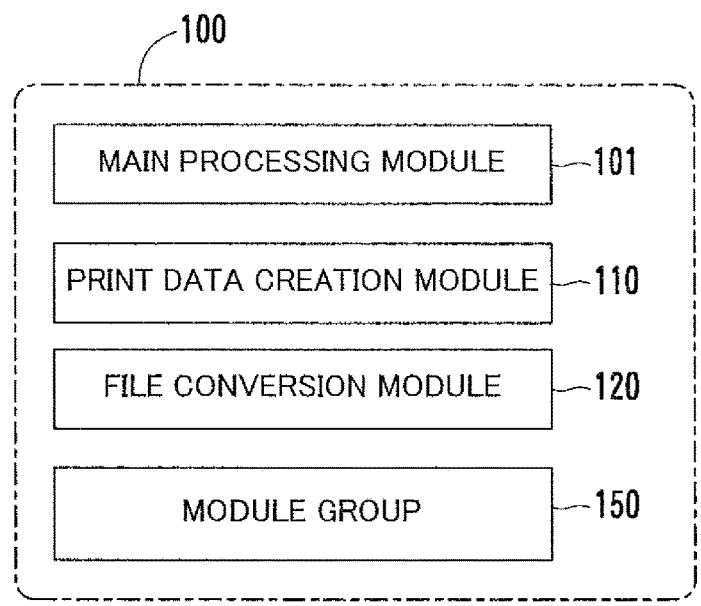
FIG. 3 is a diagram showing an example of the architecture of processing programs installed in an MFP.

As shown in FIG. 3, the software 100 has a main processing module 101, a print data creation module 110, a file conversion module 120, and a module group 150. The main processing module 101 executes the print data creation module 110, the file conversion module 120, or a module of another module group appropriately depending on the operation state of the MFP 1.

The print data creation module 110 causes, in a print job for which the MFP 1 works as a printer, the CPU 11 to execute a print data creation process. The print data creation process is to convert document data inputted as a print target into print data to be given to the printer engine 16. The print data creation process includes an RIP process.

The file conversion module 120 causes, in a file transmission job, the CPU 11 to execute a file conversion process of creating transmission data having a designated file format. The file transmission job is a transmission job of transferring transmission data (transmission file) converted into a file by using protocols such as a Server Message Block (SMB) or a File Transfer Protocol (FTP).

Figure 4:
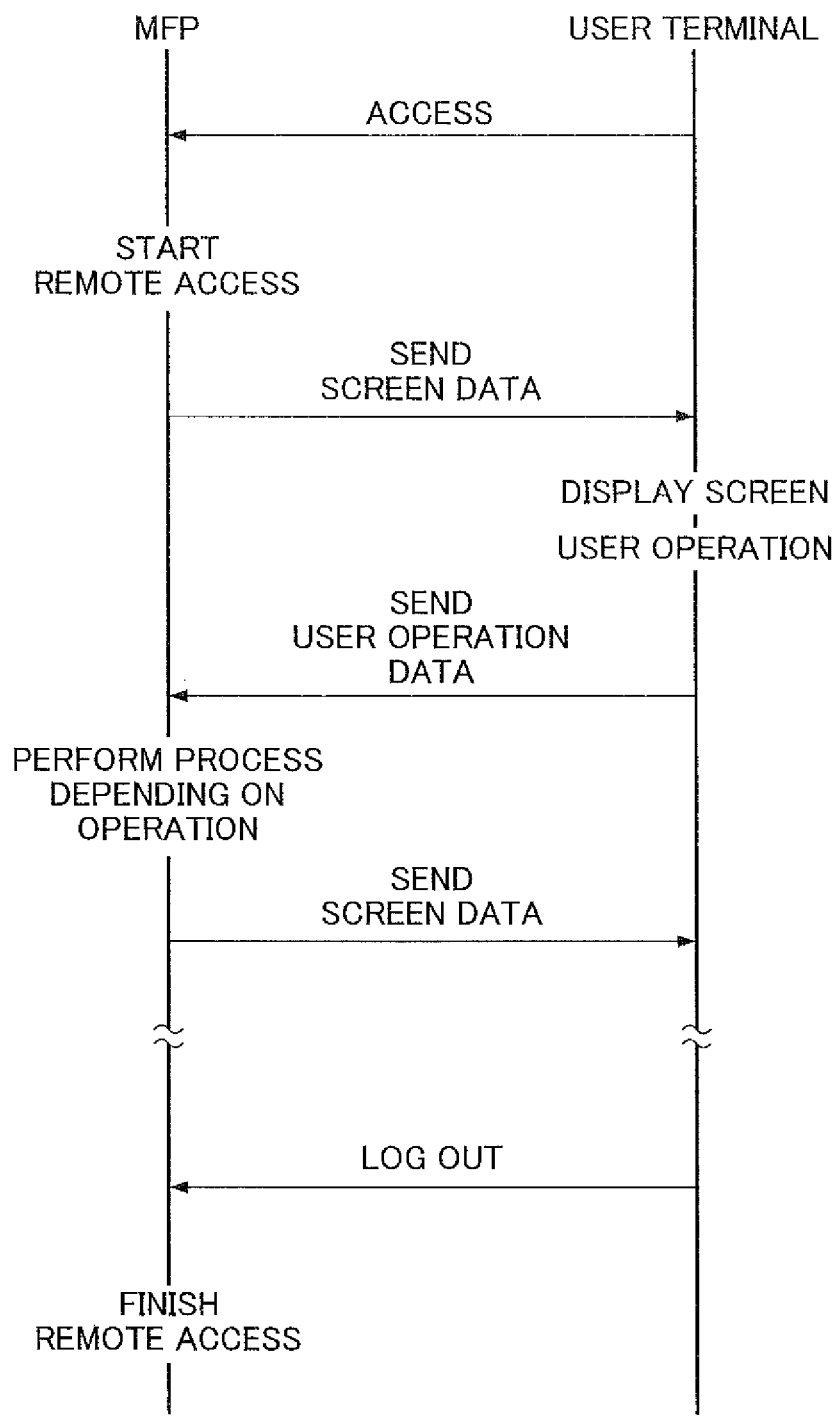
FIG. 4 is a sequence diagram showing remote access communication between an MFP and a user terminal.

FIG. 4 is a sequence diagram showing remote access communication by means of a user terminal.

The user terminal 2 follows user's instruction to request, via the LAN 5, the MFP 1 to take place a remote access connection. In response to the request from the user terminal 2, the MFP 1 becomes ready for being accessed remotely. In such a state, the MFP 1 sends, to the user terminal 2, screen data for displaying an operating screen. The user terminal 2 receives the screen data from the MFP 1 to display the operating screen on a display unit of the user terminal 2. This provides the user of the user terminal 2 with an operation environment equal to that of the operating panel 17 of the MFP 1, or, with an operation environment optimized in accordance with the specifications of the display of the user terminal 2.

At the start of the remote access connection, the MFP 1 sends, to the user terminal 2, screen data for displaying a login screen which prompts the user to enter his/her user ID and password. When the user terminal 2 displays the login screen, the user enters his/her user ID and password. When the user is authenticated in the MFP 1, the MFP 1 sends initial screen data to the user terminal 2.

Thereafter, the user changes, if necessary, from the initial screen to another screen to select a desired function or to designate the details of operation on the post-change screen to give a job execution command to the MFP 1. When the user performs operation for logging out of the MFP 1, the MFP 1 finishes the remote access connection.

Figure 5B:
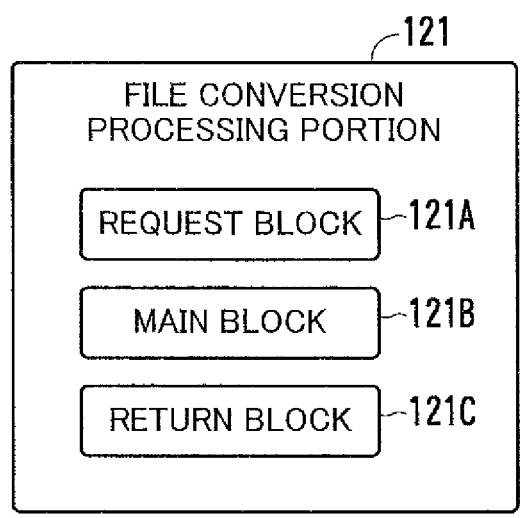
Figure 5C:
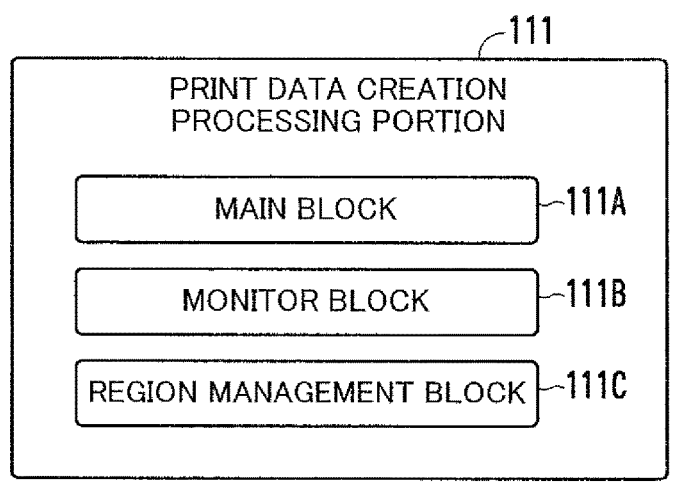

FIGS. 5A-5C show an example of the functional configuration of main portions involving shared use of a work memory in the MFP 1. Referring to FIG. 5A, the MFP 1 includes a print data creation processing portion 111 and a file conversion processing portion 121. The print data creation processing portion 111 is a functional element implemented in response to execution of the print data creation module 110 by the CPU 11. The file conversion processing portion 121 is a functional element implemented in response to execution of the file conversion module 120 by the CPU 11.

With the MFP 1, in order that limited memory resources of the RAM 12 mounted thereon are used thriftily as work areas for program execution, the print data creation module 110 and the file conversion module 120 are so configured that the print data creation processing portion 111 and the file conversion processing portion 121 share a memory region 25 of the RAM 12.

An aspect of the shared use of the memory region 25 is as follows: The print data creation processing portion 111 working as a first processing portion has the memory region 25 allocated thereto, and the file conversion processing portion 121 working as a second processing portion temporarily borrows a memory region 26 which is a part of the memory region 25 from the print data creation processing portion 111 to use the memory region 26. When the memory region 26 is not provided to the file conversion processing portion 121, the print data creation processing portion 111 is allowed to use the entirety of the memory region 25. When the memory region 26 is provided to the file conversion processing portion 121, the print data creation processing portion 111 is allowed to use the remaining part of the memory region 25.

Referring to FIG. 5B, the file conversion processing portion 121 includes a request block 121A, a main block 121B, and a return block 1210.

When a file transmission job is entered and a work area is needed for a file conversion process, the request block 121A specifies a memory size (hereinafter referred to as a size, simply) and requests the memory region 26 from the print data creation processing portion 111. When being given the memory region 26 as requested, the request block 121A informs the main block 121E that the memory region 26 has been given.

In a configuration in which the print data creation processing portion 111 dynamically sets an address range of the memory region 26 to be provided, the address range is informed through the request block 121A to the main block 121B. In contrast, in a configuration in which an address range of the memory region 26 to be provided is fixed, the address range of the memory region 26 to be provided is determined by specifying a size by the request block 121A.

The reason why the request block 121A specifies a size is that a size of a work area necessary for file conversion is different depending on the file format of transmission data to be created. It is basically preferable to specify a size as small as possible in order to reduce the influence on the print data creation process.

Hereinafter, the size of a work area necessary for file conversion is called a "required size". The largest required size of required sizes of selectable file formats is called a "maximum required size".

In this embodiment, the request block 121A of the file conversion processing portion 121 designates any one of a first size and a second size. The designation is not limitative. The request block 121A may designate any one of three sizes or more. In this embodiment, the second size is set to be larger than the first size. Therefore, for the sake of convenience, the first size and the second size are referred to as a "small size" and a "large size", respectively.

For example, in creating transmission data of PDF format, the main block 121B uses a 40 MB work area. The size of 40 MB is regarded as the small size herein. Further, in creating transmission data of compact PDF format, an 80 MB work area is required. The size of 80 MB is regarded as the large size herein.

The main block 121B of the file conversion processing portion 121 performs the file conversion process by using, as the work area, the memory region 26 provided by the print data creation processing portion 111. The memory region 26 herein is a generic name for a memory region 261 with the small size and a memory region 262 with the large size. Accordingly, in some cases, the memory region 26 provided is the memory region 261 with the small size. In other cases, the memory region 26 provided is the memory region 262 with the large size. The request block 121A informs the main block 121B that the memory region 26 has been provided. After being informed of this, the main block 121E starts the file conversion process.

When the file conversion process is completed and the work area is not used any more, the return block 121C of the file conversion processing portion 121 returns the memory region 26 to the print data creation processing portion 111. To be specific, the return block 1210 sends a return notice to the print data creation processing portion 111. If a file conversion process for the next job is subsequently performed after the completion of the file conversion process, the return block 1210 does not return the memory region to the print data creation processing portion 111.

Referring to FIG. 5C, the print data creation processing portion 111 includes a main block 111A, a monitor block 111B, and a region management block 1110.

The main block 111A uses a work area set by the region management block 111C to perform a print data creation process. The size of the work area of the main block 111A depends on whether or not the memory region 26 is provided to the file conversion processing portion 121.

The monitor block 111B monitors the presence/absence of a request for provision by the file conversion processing portion 121 and also monitors the presence/absence of a return notice. When receiving a request for provision or a return notice, the monitor block 111E informs the region management block 1110 accordingly.

The region management block 111C sets a work area to be used by the main block 111A. In response to a request for provision from the file conversion processing portion 121, the region management block 111C provides the file conversion processing portion 121 with a memory region 26. The memory region 26 is a part of, for example, a 150 MB memory region 25 allocated to the region management block 111C as a management target, and has a size specified in the request for provision. To be specific, when the small size is specified in the request, the region management block 111C informs the file conversion processing portion 121 of provision of a memory region 261 having the small size as specified in the request. When the large size is specified in the request, the region management block 111C informs the file conversion processing portion 121 of provision of a memory region 262 having the large size as specified in the request. The region management block 111C then sets, as a work area for a print data creation process, a residual part of the memory region 25 after the memory region 26 is provided to the file conversion processing portion 121.

When receiving a request for provision from the file conversion processing portion 121, the region management block 111C can provide the file conversion processing portion 121 with the memory region 26 immediately, provided that the memory region 25 is not used. In such a case, the main block 121B of the file conversion processing portion 121 can start a file conversion process without delay. Since the print data creation process is not performed, providing a memory region does not influence on performance of the print data creation process.

On the other hand, when the file conversion processing portion 121 sends a request for provision in a state where the main block 111A of the print data creation processing portion 111 uses the memory region 25, the main block 111A has to suspend the print data creation process temporarily. Usually, the print data creation process is not suspended promptly. The print data creation process is not suspended until the process reaches a breakpoint for each predetermined processing unit such as a page or a band obtained by dividing a page. After the suspension, the region management block 111C narrows the address range of the work area used by the main block 111A not to include the address range of the memory region 26 to be provided.

Since the work area for the print data creation process is narrowed, data in the memory region 25 sometimes has to be saved to the storage 19 in order to provide a part of the memory region 25. Saving the data increases the time for suspension, which significantly lowers the average performance of the print data creation process.

The problem in which the performance of the print data creation process lowers also occurs in a case where the print data creation processing portion 111 provides again a memory region 26 to the file conversion processing portion 121. If there are no jobs in queue when a file conversion process for a job is completed, then the file conversion processing portion 121 returns the memory region 26 provided thereto to the print data creation processing portion 111. If there is a job in queue at the time, then the file conversion processing portion 121 continues to use the memory region 26 as the work area instead of returning the memory region 26 to the data creation processing portion 111.

However, in a state where a memory region 261 with the small size is provided, if a work area with the large size is required to perform a file conversion process for the next job, then the file conversion processing portion 121 requests the print data creation processing portion 111 to change the work area from one with the small size to one with the large size. In such a case, as with the case of providing a new work area, the print data creation processing portion 111 has to suspend the print data creation process, provided that the print data creation processing portion 111 uses the memory region 25. Then, the print data creation processing portion 111 has to save data if necessary.

In order to eliminate the situation where the print data creation processing portion 111 provides again the memory region 26, for example, a method is conceivable of fixing the size of the memory region 26 to be provided at the large size. Stated differently, the size of the memory region 26 to be provided may be fixed at one size, considering a process for a file format that needs the largest work area among selectable file formats for file conversion process.

However, if the size of the memory region 26 to be provided is fixed, for parallel execution of the print data creation process and the file conversion process using the memory region 261 with the small size, the work area available by the print data creation processing portion 111 becomes too small. This causes the memory region 25 to have an unnecessary free region, which lowers the performance of the print data creation process.

To address this, the MFP 1 includes elements for optimizing the size to be specified for a case where the file conversion processing portion 121 requests a memory region 26 from the print data creation processing portion 111. Such elements are a predicting portion 211, a state detection portion 212, a frequency obtaining portion 213, and a processing time estimating portion 214. The elements are functional elements implemented in response to execution of the file conversion module 120 by the CPU 11.

The predicting portion 211 predicts, when the file conversion processing portion 121 requests a memory region 26 from the print data creation processing portion 111, the size of a memory region 26 required next by the file conversion processing portion 121. To be specific, the predicting portion 211 predicts a file format specified in a file transmission job which is probably entered after the file transmission job currently executed. The predicting portion 211 refers to data which is stored in advance in the ROM 13. The data indicates the correspondence between the individual file formats and required sizes. Thereby, the predicting portion 211 obtains a size corresponding to the predicted file format to use the size obtained as a prediction result (predicted size).

Upon the start of execution of a file transmission job, the file conversion processing portion 121 makes a request for provision. At a point in time when execution of the file transmission job already entered is started, the size of a memory region 26 required by the file conversion processing portion 121 is determined in advance. A required size corresponding to a file format specified in the job is a size of the memory region 26 needed at this point in time. If there are no file transmission jobs in queue at the start of execution of the file transmission job, then the size of a memory region 26 required next by the file conversion processing portion 121 has not yet been determined. The predicting portion 211 predicts whether the undetermined size is the small size or the large size.

The size (predicted size) predicted by the predicting portion 211 is given to the file conversion processing portion 121. In a case where the required size fixed at this point in time corresponds to the small size, the file conversion processing portion 121 compares the required size at this point in time and the predicted size. The file conversion processing portion 121 then requests the print data creation processing portion 111 to provide a memory region 26 (memory region 261 or memory region 262) which has at least a larger size of the compared sizes. Having at least a larger size means having a size equal to or greater than the larger size.

In other words, if at least one of the predicted size and the required size at this point in time corresponds to the large size, then the file conversion processing portion 121 requests the print data creation processing portion 111 to provide a memory region 262 with the large size or a memory region 262 with a size larger than the large size by a predetermined amount. If both the predicted size and the required size at this point in time correspond to the small size, then the file conversion processing portion 121 requests the print data creation processing portion 111 to provide a memory region 261 with the small size or a memory region 261 with a size larger than the small size by a predetermined amount. If the required size at this point in time corresponds to the large size, then the file conversion processing portion 121 requests the print data creation processing portion 111 to provide a memory region 262 with the large size or a memory region 262 with a size larger than the large size, regardless of the predicted size.

The state detection portion 212, the frequency obtaining portion 213, and the processing time estimating portion 214 provide the predicting portion 211 with information for predicted size determination.

The state detection portion 212 detects direct operation by means of the operating panel 17, the state of operation progress by means of the user terminal 2 through the LAN 5, and the operation state of the MFP 1 in accordance with operation. The state detection portion 212 is given an operation log necessary for the detection from an operation processing portion for receiving operation to display an operating screen. The state detection portion 212 is given such an operation log also from a job execution control portion for managing job execution.

The frequency obtaining portion 213 obtains a use frequency F of the file conversion processing portion 121 and a selection frequency G of a file format which needs a work area with the large size. The use frequency F and the selection frequency G are included in usage record data for the MFP 1 recorded for each user. The use frequency F shows the number of uses during a predetermined period of time T before the current time. The selection frequency G shows the number of selections during the predetermined period of time T. The use frequency F and the selection frequency G are calculated by a track record managing portion for managing the usage record data. The track record managing portion is provided in the MFP 1 or in an external management server. The frequency obtaining portion 213 obtains the use frequency F and the selection frequency G from the track record managing portion. Instead of this, the frequency obtaining portion 213 may calculate the use frequency F and the selection frequency G by itself based on the operation log.

The processing time estimating portion 214 estimates a required time T2 for a file conversion process to be performed by the file conversion processing portion 121 and a finish time t1 of a print data creation process performed currently. The required time T2 for the file conversion process depends on processing conditions such as the number of pages of a process target document, color mode, resolution, and image size. A required time is added to the current time, so that a finish time can be calculated. Therefore, estimating the required time T2 is also said to be estimating a finish time t2 of the file conversion process. The finish time t1 of the print data creation process can be determined based on a start time t0 and a required time T1 for the print data creation process. The required time T1 for the print data creation process depends on processing conditions such as the number of pages of a process target document, process mode, and image size.

The description goes on to specific operation of the MFP 1.

Figure 6A:
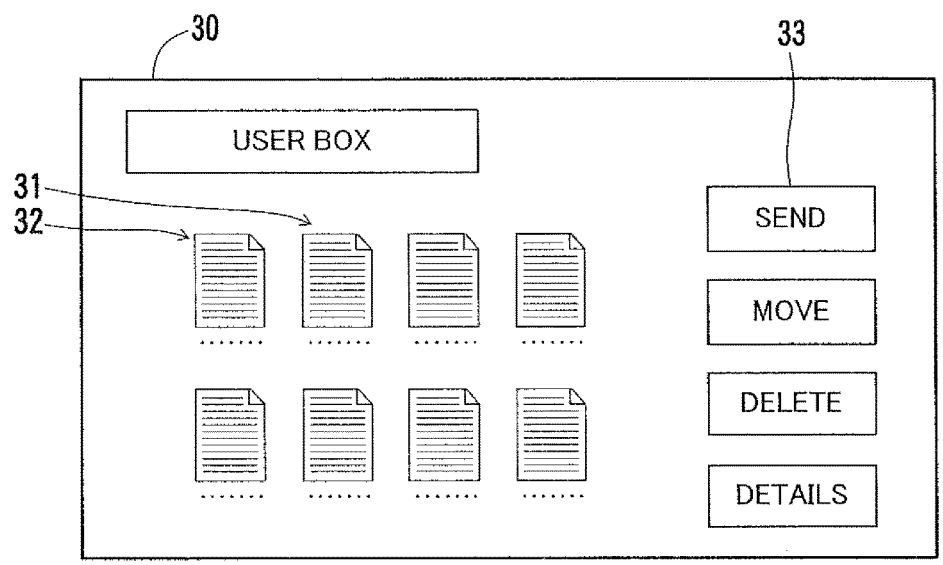
FIGS. 6A-6C are diagrams showing an example of operating screens related to a file transmission job.
Figure 6B:
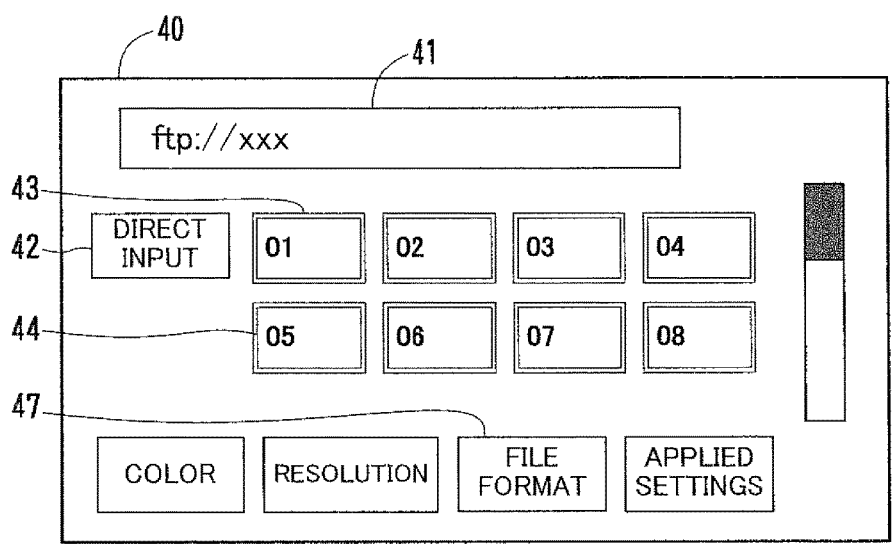
Figure 6C:
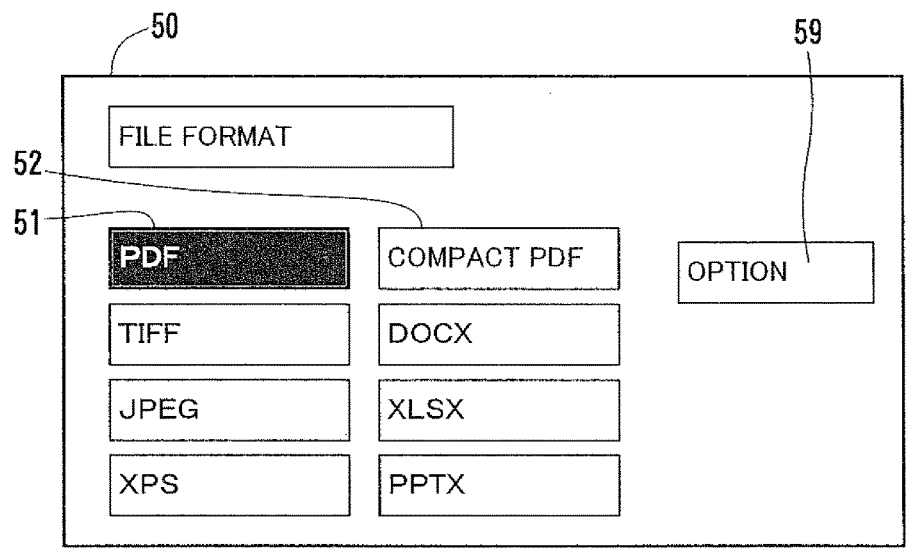

FIGS. 6A-6C show an example of operating screens related to a file transmission job. FIG. 6A shows a document selection screen 30; FIG. 6B shows a transmission setting screen 40; and FIG. 6C shows a file format selection screen 50. Operation on the operating screens is a touch gesture or mouse operation.

The document selection screen 30 of FIG. 6A is used for a logged-in user to designate a process on a document saved in a user box allocated to the logged-in user. The document selection screen 30 appears, for example, when operation for selecting a box function is performed on the initial screen. The document may be a scanned image or a file that is created in the user terminal 2 with document creation software or another software and then transferred to the MFP 1.

In the document selection screen 30, thumbnails of documents saved in the user box are displayed. In the illustrated example, eight thumbnails including thumbnails 31 and 32 are arranged in two rows and four columns. The user performs predetermined operation on a thumbnail to select a process target document, and operates a key laid out on the right end of the screen to designate a desired process.

Options for processes to be performed on the document are "send", "move", "delete", and "display details". The "send" process includes transmission to the server machine 6 or the user terminal 2, Internet-facsimile (I-FAX) transmission, and facsimile transmission via a telephone network. The "move" process includes transfer of a document to another box. The "delete" process includes deletion of a selected document. The "display details" process includes displaying a preview image and attribute information on a document such as document creation date/time and document size.

When the user operates a key 33 corresponding to "send" in the document selection screen 30, the document selection screen 30 is replaced with the transmission setting screen 40 of FIG. 6B which appears on the display viewed by the user.

The transmission setting screen 40 of FIG. 6B has a destination display field 41 on the upper end thereof. The user selectively operates numeric keys 43 and 44 and other numeric keys to designate, as a destination, one of candidate destinations registered in advance in association with the numbers. The designated destination is displayed in the destination display field 41. Operating a scroll bar on the right end of the screen changes the display target page of a registered numbers list, and a candidate destination corresponding to a numeric key changes to another candidate destination. The user operates a key 42 on the left end of the screen to designate a direct input mode. The user then uses a hardware keyboard or software keyboard (not shown) to enter a desired destination in the destination display field 41.

The transmission setting screen 40 has item selection keys on the lower end thereof. The item options are "color", "resolution", "file format", and "applied settings". When the user operates an item selection key to select an item, a setting screen for the selected item appears. The "color" has options of automatic, full-color, and monochrome. The "resolution" and the "file format" have the respective options. In an unillustrated setting screen for "applied settings", it is possible to set predetermined information, e.g., a document name for file transmission, and a title of an e-mail message for e-mail transmission.

When the user operates an item selection key 47 on the transmission setting screen 40, the transmission setting screen 40 is replaced with the file format selection screen 50 of FIG. 6C.

In the file format selection screen 50 of FIG. 6C, selection keys including selection keys 51 and 52 are displayed. Each of the selection keys corresponds to any selectable file formats of transmission data. The selectable file formats are "PDF", "compact PDF", "TIFF", "DOCX", and "JPEG" as shown in FIG. 6C. When the file format selection screen 50 appears, the default file format or the file format designated the last time is selected. In the example of FIG. 6C, "PDF" is selected and a selection key 51 corresponding to "PDF" is highlighted to be distinguished from the other selection keys.

In the file format selection screen 50, an option key 59 is provided in the right end thereof. The user is allowed to set option items such as encryption on an unillustrated option setting screen which appears in response to the operation on the option key 59.

The operation steps are described below for the case where the user uses the operating panel 17 to cause the MFP 1 to send a document saved in the box 20. The user who has logged into the MFP 1 selects a document in the document selection screen 30, and touches the key 33 to select "send". The user then designates a destination in the transmission setting screen 40, and makes settings for color and resolution if necessary. For file transmission, the user designates a desired file format in the file format selection screen 50. After finishing all the necessary designations, the user presses a start key provided in a hardware key layout portion of the operating panel 17. Thereby, a transmission job is entered and a command to start executing the job is given to the MFP 1.

Figure 7:
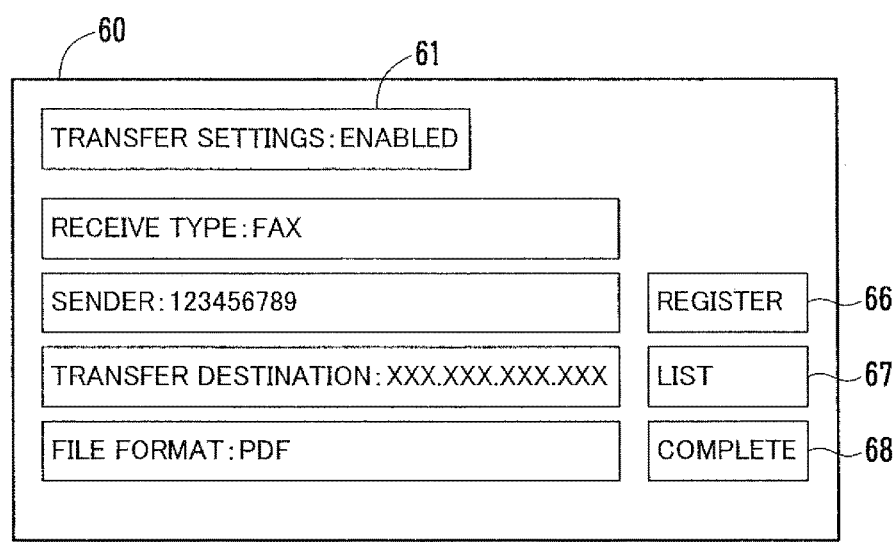
FIG. 7 is a diagram showing an example of an automatic transfer setting screen.

FIG. 7 shows an example of an automatic transfer setting screen 60. The MFP 1 has an automatic transfer function to transfer data sent by an external device to another external device. The automatic transfer setting screen 60 is used to make settings for transfer operation.

Whether the automatic transfer function is enabled or not is indicated in a field 61 of the upper end of the automatic transfer setting screen 60. In the illustrated example, the automatic transfer function is enabled. Options for receive type related to transfer target include facsimile, Internet facsimile, file transfer, and electronic mail. In FIG. 7, facsimile (FAX) is selected.

Information to be designated as a sender (transfer source) of transfer target data to be received by the MFP 1 is different among receive types. For example, a facsimile number is designated for facsimile, and an IP address is designated for file transfer.

Designating the transfer destination determines a transfer type. Options for transfer type are similar to those for receive type. In the case where a mail address is set as the transfer destination, automatic transfer of attaching data to an e-mail message and sending the resultant is performed. The transfer destination may be a box 20 of the MFP 1. For designating the box 20, the user enters a box ID (name or number).

In the case where the transfer type is file transfer or electronic mail, specifically, where received data is converted into a file before transmission, the file format can be designated. In the case where the transfer type is facsimile or box save, operation for designating the file format is not necessary. Selectable file formats include PDF and compact PDF. In the example of FIG. 7, the designated file format is PDF.

The user operates a register key 66 to register automatic transfer by which data sent by a designated sender is converted into a designated format and the resultant is sent to a designated transfer destination. Operating a list key 67 causes a list of registered automatic transfer to be displayed. Operating a complete key 68 finishes displaying the automatic transfer setting screen 60.

FIG. 8 shows an example of a transfer setting list screen 70. The transfer setting list screen 70 appears in response to operation performed on the list key 67 of the automatic transfer setting screen 60.

In the transfer setting list screen 70, registered automatic transfer is displayed five by five. The setting items displayed include "sender", "transfer type" and "transfer destination". When a next page key 73 is pressed in a state where automatic transfer given No. 1 through No. 5 are displayed as shown in FIG. 8, then automatic transfer given No. 6 through No. 10 are displayed. It is possible to edit the displayed setting details, or, delete automatic transfer corresponding to any number, namely, to delete the registered automatic transfer.

The automatic transfer function is to, when data corresponding to any of the registered automatic transfer which can be checked by the user on the transfer setting list screen 70 is received, transfer the received data automatically. For example, referring to FIG. 8, if designation of the automatic transfer given No. 1 in the transfer setting list screen 70 corresponds to the example of FIG. 7, then the MFP 1 converts image data received through facsimile from a destination corresponding to the destination facsimile number "122456789" into a PDF file to send the resultant to the transfer destination "xxx.xxx.xxx.xxx".

FIG. 9 shows examples of a job list screen. A job entered into the MFP 1 is managed by the job execution control portion which is implemented in response to execution of the software 100 by the CPU 11. The user of the MFP 1 performs predetermined operation to display a job list screen.

Referring to (A) of FIG. 9, a job list screen 80 displays a list of jobs that were entered but have not yet been completed. The number of jobs displayed at one time is 5. If there are 6 unfinished jobs or more, a desired job may be displayed by operating the next page key and the previous page key. Further, the job list screen 80 has a key for stopping a job, a key for deleting a job, and a key for displaying the details of job settings.

Display items of each job in the job list screen 80 include "identification number", "type", "document name/destination" "time", "number of sheets", and "state". Display information on "time" shows a time at which the corresponding job was entered. Display information on "number of sheets" shows the total number of processing target pages and the currently-processed page. The field of "state" shows, depending on the job type, a character string representing the state of operation progress of the corresponding job. The character string is, for example, printing, printing queue, sending, receiving, send queue, receive queue, and saving.

Referring to (A) of FIG. 9, the state of Internet facsimile (I-FAX) transmission for identification number 2 is "sending", and the states of NET transmission (file transmission) for identification numbers 3 and 4 are "send queue". In other words, a facsimile transmission job corresponding to the type of I-FAX transmission is in progress, and two file transmission jobs corresponding to the type of Net transmission are in queue. Since a print job for identification number 1 is in progress (being executed), a copy job which corresponds to identification number 5 and involves using the printer engine 16 is in printing queue (standby).

When execution of a job is completed, the indication of the completed job disappears from the job list screen 80. Referring to (B) of FIG. 9, a job list screen 80b is exemplified which shows a job list after the jobs corresponding to identification numbers 1 and 2 (see (A) of FIG. 9) are completed. In the job list screen 80b of (B) of FIG. 9, a file transmission job for identification number 3 is in progress, a file transmission job for identification number 4 is in queue, and a copy job for identification number 5 is in progress (being executed).

As shown in the job list screens 80 and 80b, regarding jobs involving processes which cannot be executed in parallel with each other, i.e., regarding a combination of a print job and a copy job, until execution of the process of a first job entered previously is completed, a second job entered later shall be in queue. Once execution of the process of the first job is completed, execution of the process of the second job is started.

A file transmission job can be executed in parallel with a print job, and also can be executed in parallel with a copy job. The file transmission job does not involve using the printer engine 16; therefore it can be executed while the printer engine 16 is used for another job. The print job and the copy job involve using the RAM 12 as a work area to create print data. The file transmission job involves using the RAM 12 as a work area to perform a file conversion process.

Figure 10:
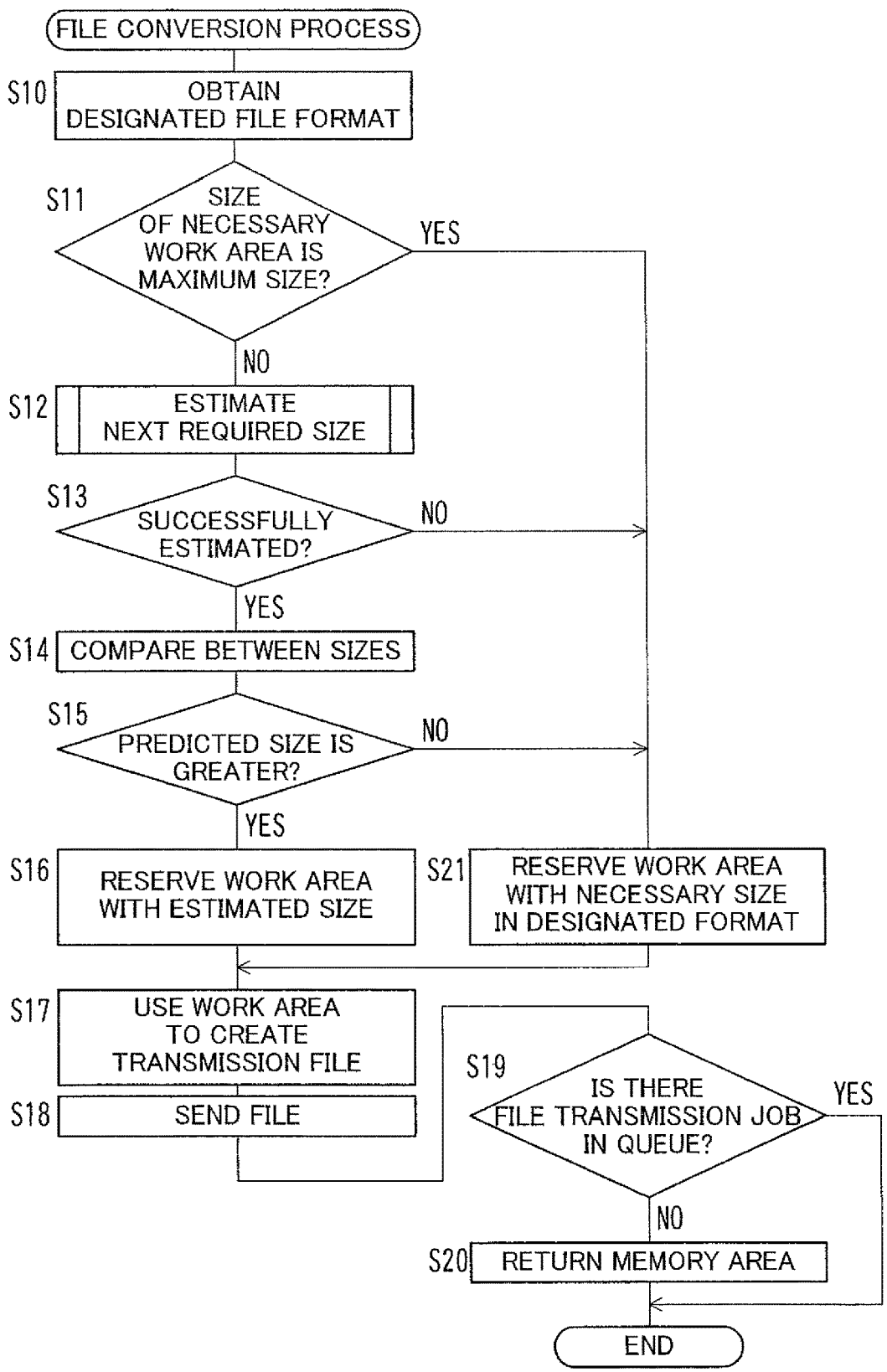
FIG. 10 is a flowchart depicting the flow of a file conversion process performed for a file transmission job.

FIG. 10 is a flowchart depicting the flow of a file conversion process performed for a file transmission job.

The file conversion processing portion 121 obtains a file format designated in a file transmission job of which execution is started (Step S10). The file conversion processing portion 121 then determines whether or not the file format obtained corresponds to a file format which requires the largest work area among selectable file formats for the file conversion process (Step S11). In other words, the file conversion processing portion 121 determines whether or not the size of a work area necessary for the file conversion process to be performed (required size at this point in time) corresponds to the maximum required size. It is noted that, in this embodiment, the required size is the small size or the large size, and the maximum required size is the large size. Therefore, it is determined in Step S11 whether or not the required size for the file transmission job currently executed corresponds to the large size.

If the required size is determined to correspond to the large size (YES in Step S11), then the process goes to Step S21. In Step S21, the file conversion processing portion 121 requests a memory region 26 with the required size corresponding to the file format obtained in Step S10 from the print data creation processing portion 111. Stated differently, the file conversion processing portion 121 reserves, as the work area, a memory region 262 with the large size which is the required size determined at this point in time. The process then goes to Step S17.

If the result of determination in Step S11 is NO, specifically, if the required size at this point in time is determined to correspond to the small size, then the predicting portion 211 executes a prediction routine for estimating the next required size (Step S12). In accordance with the prediction result obtained through the prediction routine, the size of the work area is determined in the following manner.

The file conversion processing portion 121 checks whether or not the predicting portion 211 estimated the next required size successfully (Step S13). At this time, if the prediction result shows that the predicted size is the large size or the small size, this means that the predicting portion 211 estimated the next required size successfully. In contrast, if the prediction result shows "no predicted size found", this means that the predicting portion 211 did not estimate the next required size successfully. If the predicting portion 211 did not estimate the next required size successfully (NO in Step S13), then the process goes to the foregoing Step S21.

If the predicting portion 211 estimated the next required size successfully (YES in Step S13), then the file conversion processing portion 121 compares the required size at this point in time with the predicted size (Step S14). If the predicted size is greater than the required size at this point in time (YES in Step S15), then the file conversion processing portion 121 requests a memory region 262 with the predicted size from the print data creation processing portion 111. Stated differently, the file conversion processing portion 121 reserves, as the work area, a memory region 262 with the size which is estimated to be needed next and is larger than the required size at this point in time (Step S16). The process then goes to the foregoing Step S17, and then to Step S18.

If the predicted size is not greater than the required size at this point in time (NO in Step S15), then the process goes to the foregoing Step S21. It is noted that, in this embodiment, any one of the two sizes of the small size and the large size is settable as the required size. Therefore, only in a case where both the required size at this point in time and the predicted size correspond to the small size, the process goes from Step S15 to Step S21. In such a case, a memory region 261 with the small size is reserved as the work area in Step S21.

In Step S17, the file conversion processing portion 121 uses the memory region 262 with the large size or the memory region 261 with the small size reserved through the provision by the print data creation processing portion 111 to perform the file conversion process for the file transmission job currently executed. After completing the file conversion process, the file conversion processing portion 121 performs a file transmission process of conveying the created transmission file to a communication processing portion for sending the transmission file (Step S18). As the post-processing, the file conversion processing portion 121 checks whether or not there is a file transmission job in queue (Step S19). If there is no file transmission job in queue (NO in Step S19), then the file conversion processing portion 121 outputs a return notice to the print data creation processing portion 111 for returning the memory region (Step S20).

Figure 11:
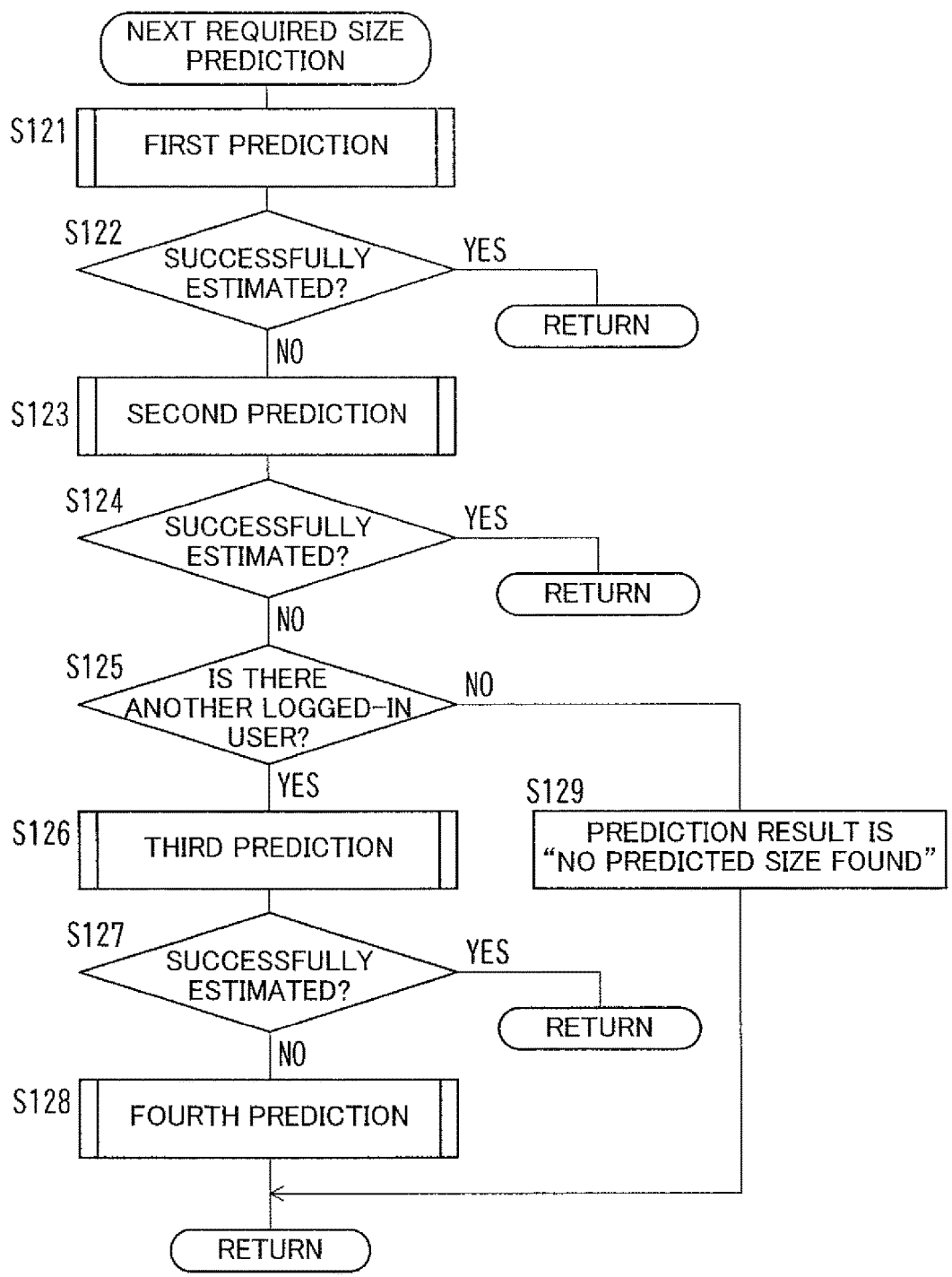
FIG. 11 is a flowchart depicting the flow of a next required size prediction routine of a file conversion process.

FIG. 11 is a flowchart depicting the flow of a next required size prediction routine of the file conversion process of FIG. 10.

The predicting portion 211 executes a first prediction subroutine (Step S121). If the size is estimated successfully through the first subroutine (YES in Step S122), then the process promptly goes back to the routine of FIG. 10. If the size is not estimated successfully through the first subroutine (NO in Step S122), then the predicting portion 211 executes a second prediction subroutine (Step S123). If the size is estimated successfully through the second subroutine (YES in Step S124), then the process promptly goes back to the routine of FIG. 10.

If the size is not estimated successfully through the second subroutine (NO in Step S124), then the predicting portion 211 checks whether or not there is another logged-in user who is not the user who entered the file transmission job of which execution is started (Step S125).

If there is such another logged-in user (YES in Step S125), then the predicting portion 211 executes a third prediction subroutine (Step S126). If there is no other logged-in users (No in Step S125), then the predicting portion 211 determines that the prediction result is "no predicted size found" (Step S129).

If the size is estimated successfully through the third prediction subroutine (YES in Step S127), then the process promptly goes back to the routine of FIG. 10. If the size is not estimated successfully through the third prediction subroutine (NO in Step S127), then the predicting portion 211 executes a fourth prediction subroutine (Step S128).

Figure 12:
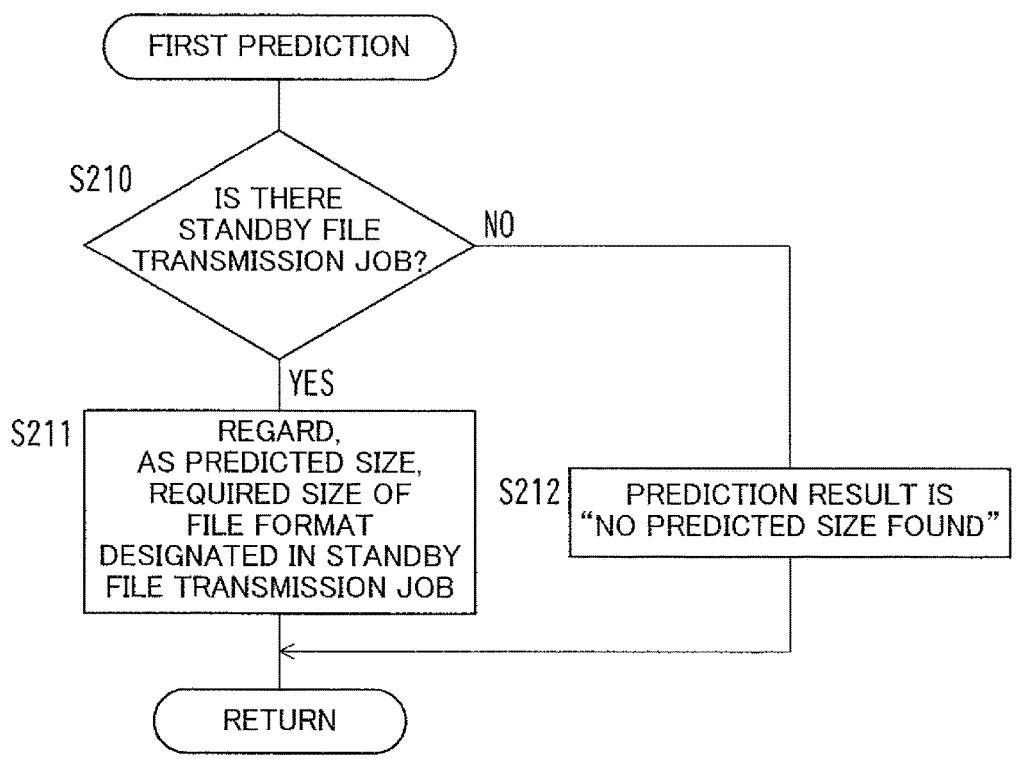
FIG. 12 is a flowchart depicting the flow of a first prediction subroutine of a next required size prediction routine.

FIG. 12 is a flowchart depicting the flow of the first prediction subroutine of FIG. 11. The predicting portion 211 checks whether or not there is a standby file transmission job (Step S210). If there is no standby file transmission job (NO in Step S210), then the predicting portion 211 determines that the prediction result is "no predicted size found" (Step S212). If there is a standby file transmission job (YES in Step S210), then the predicting portion 211 regards, as the predicted size, a required size of the file format designated in the standby file transmission job (Step S211).

In Step S211, if a plurality of file transmission jobs is in queue, then the predicting portion 211 regards, as the predicted size, the largest size among the required sizes for the file transmission jobs in queue. Stated differently, if jobs in queue include a job for which the required size corresponds to the large size, then the large size is regarded as the predicted size. It is not necessary to check whether or not a job in queue of which a required size corresponds to the large size is a job to be executed next.

Figure 13:
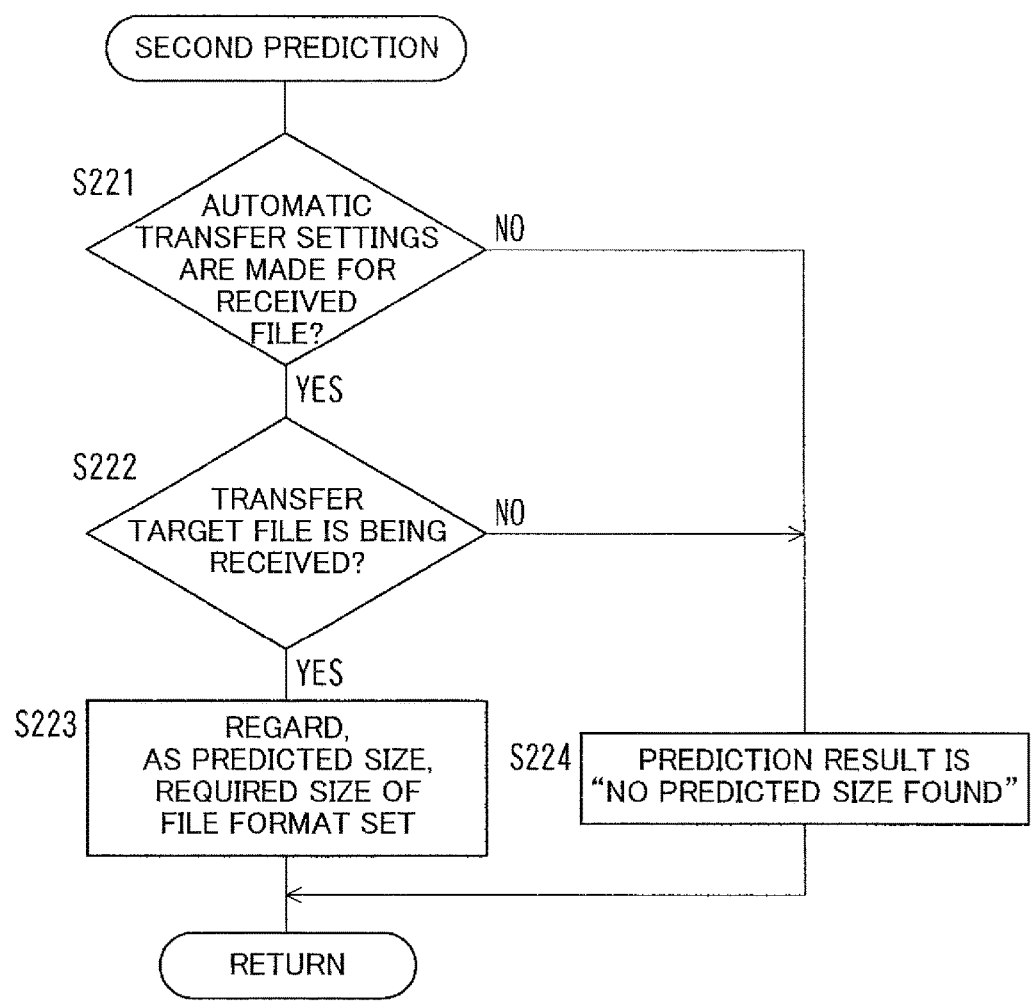
FIG. 13 is a flowchart depicting the flow of a second prediction subroutine.

FIG. 13 is a flowchart depicting the flow of the second prediction subroutine of FIG. 11. The predicting portion 211 checks whether or not the automatic transfer settings are made (Step S221). If the automatic transfer settings are not made (NO in Step S221), then the predicting portion 211 determines that the prediction result is "no predicted size found" which remains unchanged from the first prediction result (Step S224).

If the automatic transfer settings are made (YES in Step S221), then the predicting portion 211 checks whether or not the MFP 1 is currently receiving a transfer target file from an external device (Step S222).

If the MFP 1 is currently receiving the transfer target file (Yes in Step S222), then the predicting portion 211 regards, as the predicted size, a required size of the file format set for the transfer target file (Step S223). If the MFP 1 is not currently receiving the transfer target file (No in Step S222), that is to say, if it is not clear whether or not a file transmission job is entered automatically, then the predicting portion 211 determines that the prediction result is "no predicted size found" (Step S224).

Figure 14:
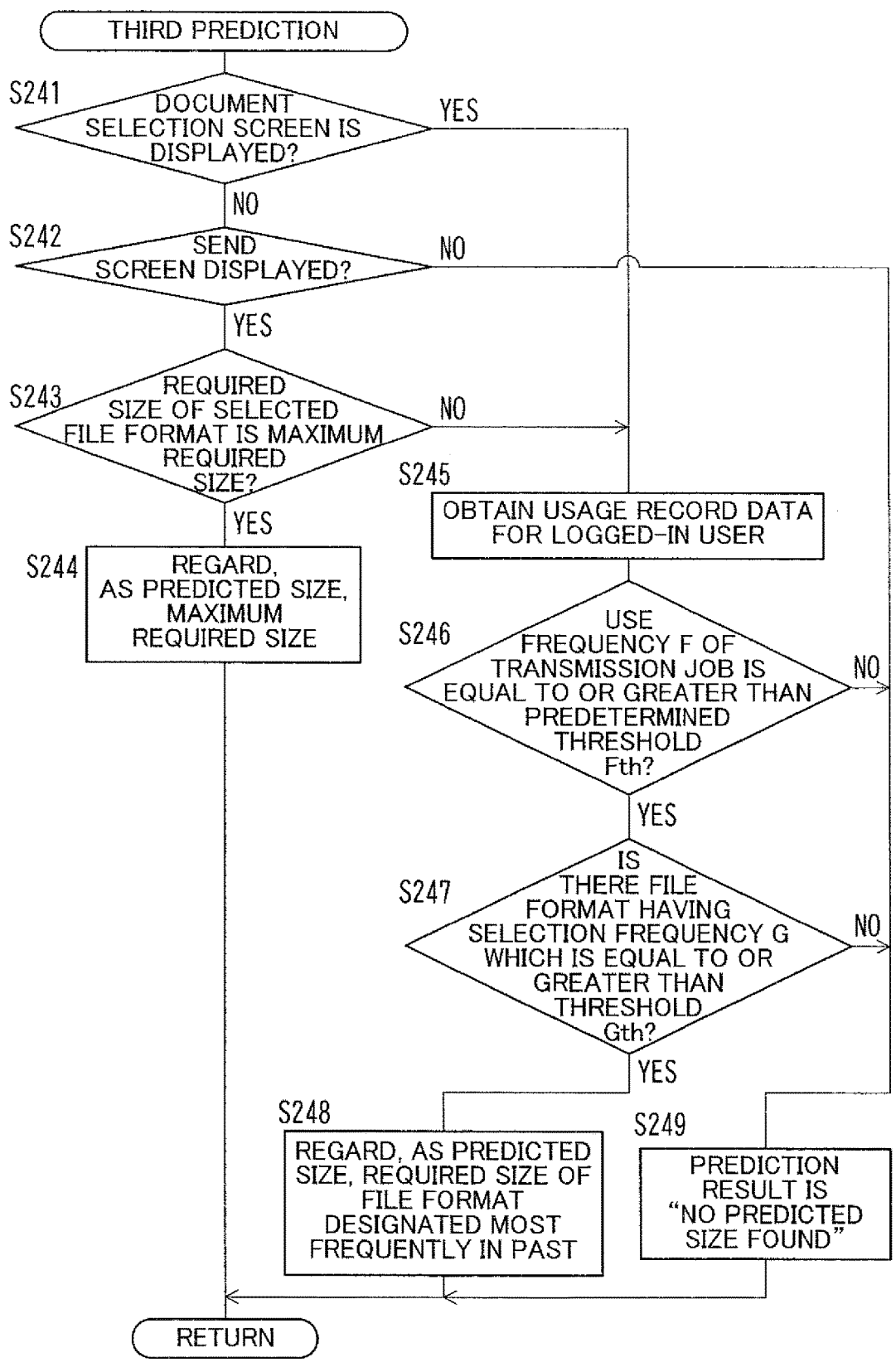
FIG. 14 is a flowchart depicting the flow of a third prediction subroutine.

FIG. 14 is a flowchart depicting the flow of the third prediction subroutine of FIG. 11. The predicting portion 211 checks whether or not the state detected by the state detection portion 212 corresponds to a state where the document selection screen 30 of FIG. 6A is displayed for the other logged-in user (Step S241). Stated differently, the predicting portion 211 checks whether or not the state detected by the state detection portion 212 corresponds to a state where the other logged-in user causes the document selection screen 30 to appear. If the document selection screen 30 is displayed for the other logged-in user at least in any one of the MFP 1 and the user terminal 2 (YES in Step S241), then the process goes to Step S245.

If the document selection screen 30 is not displayed for the other logged-in user (NO in Step S241), then the predicting portion 211 checks whether or not the detected state corresponds to a state where a send screen is displayed for the other logged-in user (Step S242). The send screen is, for example, the transmission setting screen 40 of FIG. 6B or the file format selection screen 50 of FIG. 6C. If such a send screen is not displayed (NO in Step S242), then the predicting portion 211 determines that the prediction result is "no predicted size found" (Step S249).

If the send screen is displayed in at least one of the MFP 1 and the user terminal 2 (YES in Step S242), then the predicting portion 211 checks whether or not the required size of the file format selected at this point in time corresponds to the maximum required size (Step S243). If the required size of the file format selected corresponds to the maximum required size (YES in Step S243), then the predicting portion 211 regards, as the predicted size, the maximum required size (Step S244). As discussed above, in this embodiment, the maximum required size corresponds to the large size. If the required size of the file format selected does not correspond to the maximum required size (NO in Step S243), then the process goes to Step S245.

In Step S245, the predicting portion 211 obtains, through the frequency obtaining portion 213, usage record data for the other logged-in user who performed operation for displaying the document selection screen 30 or the send screen displayed at this point in time. If the use frequency F corresponding to the frequency of designation of the file transmission job in the usage record data obtained is not equal to or greater than a predetermined threshold Fth (NO in Step S246), then the predicting portion 211 determines that the prediction result is "no predicted size found" (Step S249).

If the use frequency F is equal to or greater than the predetermined threshold Fth (YES in Step S246), then the predicting portion 211 checks whether or not there is a file format having a selection frequency G which is equal to or greater than a predetermined threshold Gth among the file formats designated in the file transmission jobs that were entered previously by the other logged-in user (Step S247). Stated differently, the predicting portion 211 checks which file format was frequently designated by the other logged-in user.

If there is no file formats having the selection frequency G equal to or greater than the threshold Gth (NO in Step S247), then the predicting portion 211 determines that the prediction result is "no predicted size found" (Step S249). If there is a file format having the selection frequency G equal to or greater than the threshold Gth (YES in Step S247), then the predicting portion 211 regards, as the predicted size, a required size of the file format designated most frequently in the past (Step S248).

Figure 15:
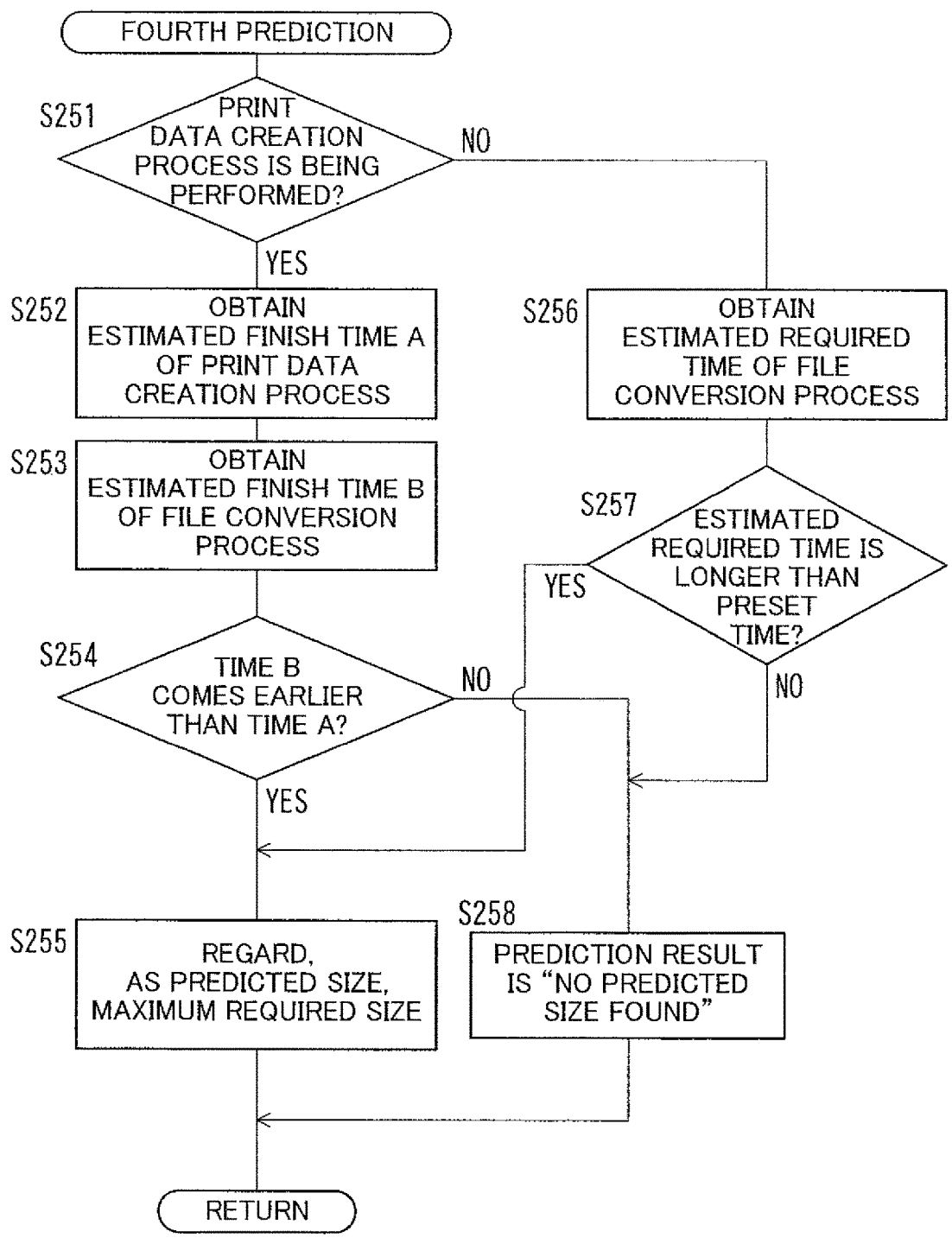
FIG. 15 is a flowchart depicting the flow of a fourth prediction subroutine.

FIG. 15 is a flowchart depicting the flow of the fourth prediction subroutine of FIG. 11. The predicting portion 211 checks whether or not the print data creation processing portion 111 currently performs a print data creation process (Step S251).

If the print data creation process is currently performed (YES in Step S251), then the predicting portion 211 obtains an estimated finish time t1 of the print data creation process from the processing time estimating portion 214 (Step S252). The predicting portion 211 obtains, from the processing time estimating portion 214, an estimated finish time t2 of a file conversion process to be performed at this point in time by the file conversion processing portion 121 (Step S253). The predicting portion 211 then determines which of the estimated finish time t1 and the estimated finish time t2 comes earlier (Step S254).

If the estimated finish time t2 comes earlier than the estimated finish time t1 (YES in Step S254), then the predicting portion 211 regards, as the predicted size, the maximum required size (Step S255). The reason for this is as follows.

In the case where the print data creation process is still performed when the file conversion process to be performed this time is completed, it is probable that, before the print data creation process is completed, a new file transmission job is entered and another file conversion process is performed. If the size of a memory region required for the file conversion process to be performed this time is smaller than the size of a memory region required for a file conversion process to be performed next, then the print data creation processing portion 111 has to provide the file conversion processing portion 121 with another memory region. Instead, as long as the memory region 262 having the maximum required size is provided for the file conversion process to be performed this time, it is unnecessary for the print data creation processing portion 111 to provide another memory region. In order to avoid lowering the performance of the print data creation process, the predicting portion 211 regards, as the predicted size, the maximum required size.

If the check result of Step S254 is NO, specifically, if the estimated finish time t2 comes later than the estimated finish time t1, then the predicting portion 211 determines that the prediction result is "no predicted size found" (Step S258).

On the other hand, in the case where the check result of Step S251 is NO, specifically, in the case where the print data creation process is not performed currently, the predicting portion 211 obtains, from the processing time estimating portion 214, the estimated required time T2 of the file conversion process to be performed at this point in time by the file conversion processing portion 121 (Step S256). If the estimated required time T2 is longer than a predetermined time Tth (30 seconds, for example) (YES in Step S257), then the predicting portion 211 regards, as the predicted size, the maximum required size (Step S255). The reason for this is as follows.

Suppose that the MFP 1 is instructed to execute print jobs one after another at short intervals. In such a case, the longer the processing time of the file conversion process is, the higher the possibility that a new file transmission job is entered before the completion of the file conversion process, and the new file transmission job has to be in queue. In other words, a situation tends to occur in which, when execution of a standby file transmission job is started when execution of one file transmission job is completed, a print data creation process is still performed. In view of this, in order not to lower the performance of the print data creation process, the predicting portion 211 regards, as the predicted size, the maximum required size.

If the estimated required time is found to be shorter than a predetermined time in Step S257, then the predicting portion 211 determines that the prediction result is "no predicted size found" (Step S258).

Figure 16:
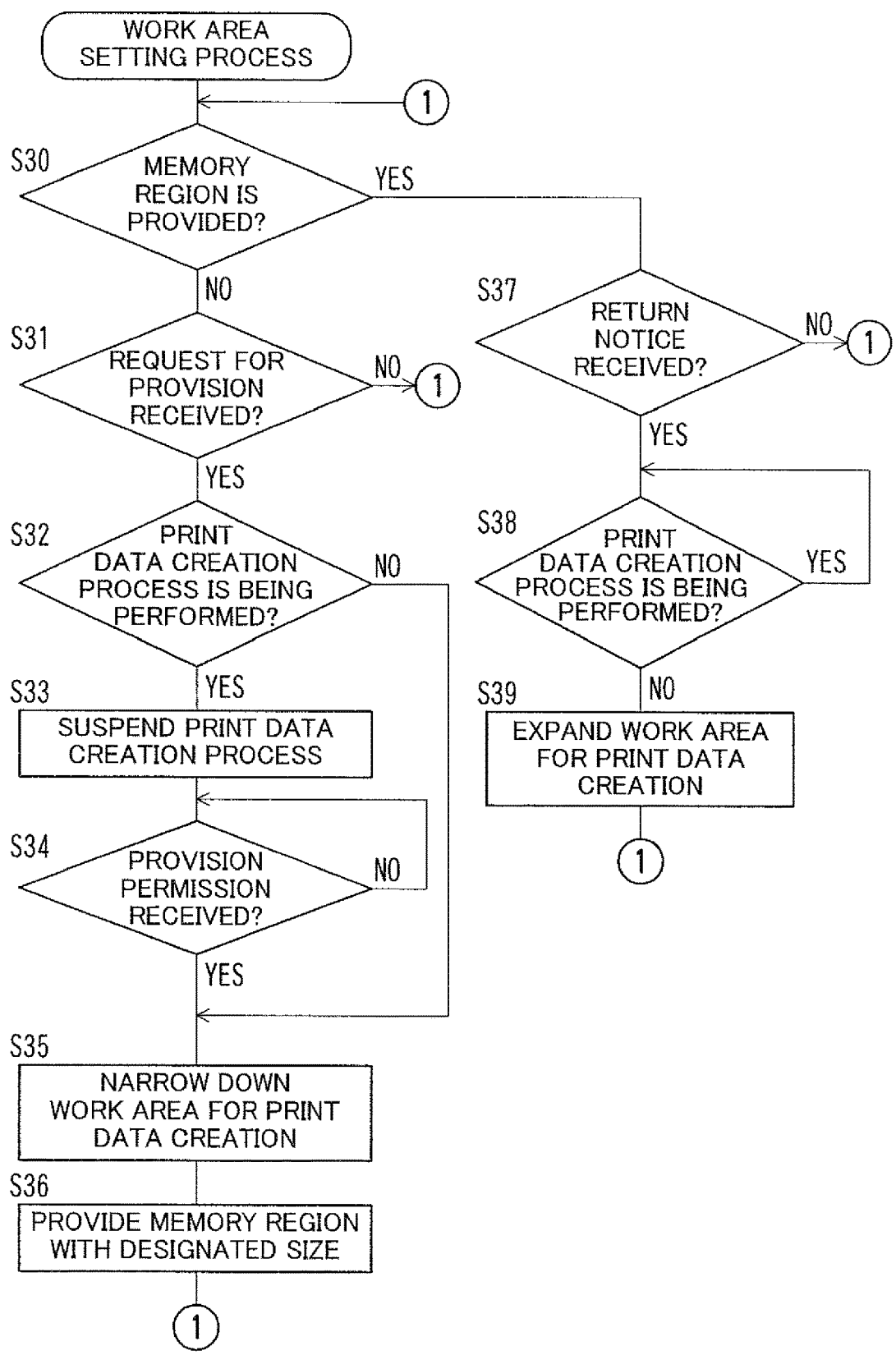
FIG. 16 is a flowchart depicting the flow of a work area setting process performed by a print data creation portion.

FIG. 16 is a flowchart depicting the flow of a work area setting process performed by the print data creation portion 111.

If a memory region 26 is not provided to the file conversion processing portion 121 (NO in Step S30), then the region management block 111C of the print data creation portion 111 checks whether or not a request to provide a memory region 26 is sent from the file conversion processing portion 121 (Step S31). If such a request is not made (NO in Step S31), then the process goes back to Step S30.

If such a request is made (YES in Step S31), then the region management block 111ticC checks whether or not a print data creation process is being performed (Step S32). If the main block 111A currently performs the print data creation process (YES in Step S32), then the region management block 111C requests the main block 111A to suspend the print data creation process (Step S33), and waits for the main block 111A to send a message indicating that provision for a memory region 26 is allowed (Step S34). The message is sent for the case where the main block 111A which has stopped the print data creation process in response to the request for suspension saves data in the memory region 25 to the storage 19 if necessary and determines that the reduction in the work area causes no problems.

When receiving the message indicating that provision for a memory region 26 is allowed, the region management block 111C narrows down the work area used by the individual blocks of the print data creation portion 111 from the entirety of the memory region 25 to a part thereof other than the memory region 26 to be provided to the file conversion processing portion 121 (Step S35). The settings on the work area are informed to the main block 111A. When being informed of this, the region management block 111C resumes the print data creation process with the narrowed work area used. However, if the process goes from Step S32 to Step S35 because the print data creation process is not performed, then the main block 111A does not perform the process for resumption.

After changing the settings on the work area for the print data creation portion 111, the region management block 111C provides the file conversion processing portion 121 with a memory region 60 having the same size as designated in the request for provision (Step S36). The process then goes back to Step S30.

If the check result in Step S30 is YES, specifically, if the memory region 26 is provided to the file conversion processing portion 121 at this point in time, then the region management block 111C checks whether or not a return notice is received from the file conversion processing portion 121 (Step S37).

If the return notice is received (YES in Step S37), then the region management block 111C expands the work area for the print data creation portion 111 to the entirety of the memory region 25 (Step S39) immediately if the print data creation process is not being performed, or, alternatively, after the completion of the print data creation process if the process is being performed (Step S38).

The description goes on to operation by the MFP 1 in which the memory region 25 is shared.

Operation Example 1

An example is taken in which a user A uses the operating panel 17 to operate the MFP 1, and a user B accesses the MFP 1 from a remote location. Both the user A and the user B are successfully authenticated to log onto the MFP 1. The user terminal 2 used for the remote access connection is preferably an information device having an access application program therein. The user terminal 2 may be a stationary or portable personal computer, a smartphone, or a Personal Digital Assistant (PDA).

The user A places the document sheet 90 onto the ADF 14, and instructs the MFP 1 to execute a file transmission job (job 1). In the job 1, a designated file format is PDF, and the required size of PDF is the small size. When the user A instructs the MFP 1 to execute the job 1, the user B displays the transmission setting screen 40 for transmission of a document saved in the box 20. It is supposed that, at this point in time, compact PDF of which the required size is the large size is already designated.

In the foregoing situation, the MFP 1 determines that, immediately after the job 1, the user B probably gives a command to execute a file transmission job (job 2). The MFP 1 then reserves, as a work area for a file conversion process of the job 1, a memory region 262 having the large size rather than a memory region 261 having the small size which is the actual required size. The MFP 1 then uses the memory region 262 thus reserved to execute the job 1.

According to Operation Example 1, even if the job 2 is entered during the execution of the job 1, it is unnecessary to provide a new work area for execution of the job 2 because the memory region 262 having the large size is reserved during the execution of the job 1. Therefore, the reserved memory region 262 having the large size is used to create a compact PDF file to be sent.

Operation Example 2

An example is taken in which a user C accesses the MFP 1 from a remote location, and a user D uses the operating panel 17 to operate the MFP 1. Both the user C and the user D are logged-in users successfully authenticated by the MFP 1.

The user C gives a command to execute a file transmission job (job 3) of sending a document saved in the box 20. In the job 3, PDF is designated as the file format. It is assumed that, when the user C gives a command to execute the job 3, the user D displays an operating screen rather than a send screen.

The MFP 1 extracts, from usage record data indicating a history of use of the MFP 1 by the user D, a use frequency F of the file transmission job and a selection frequency G of the file format of which the required size is the large size. The MFP 1 obtains, as for the user D, the use frequency F of, for example, 80%, and the selection frequency G of, for example, 90%.

In the MFP 1, a threshold of the designated frequency is preset at 70%, and a threshold of the selection frequency is preset at 70%. The MFP 1 determines that, immediately after the job 3, the user D probably gives a command to execute a file transmission job (job 4) which requires a work area having the large size. Based on the determination, the MFP 1 reserves, as a work area for a file conversion process of the job 3, a memory region 262 having the large size rather than a memory region 261 having the small size which is the actual required size. The MFP 1 then uses the memory region 262 having the large size thus reserved to execute the job 3.

As with Operation Example 1, according to Operation Example 2, even if the job 4 is entered during the execution of the job 3, it is unnecessary to provide a new work area for execution of the job 4 because the memory region 262 having the large size is reserved during the execution of the job 3.

Operation Example 3

An example is taken in which a user B accesses the MFP 1 from a remote location. The user E gives a command to execute a file transmission job (job 5) of sending a document saved in the box 20. In the job 5, PDF is designated as the file format.

When execution of the job 5 is instructed, the MFP 1 determines whether or not the automatic transfer function is enabled, and whether or not automatic transfer is registered. It is assumed in this example that automatic transfer of transferring, to the server machine 6, facsimile reception data sent from a certain sender is registered, and that compact PDF is set as the file format.

The MFP 1 determines whether or not facsimile reception is being performed. If the facsimile reception is currently performed, then the MFP 1 determines whether or not the facsimile reception corresponds to the registered automatic transfer. If facsimile reception corresponding to the registered automatic transfer is being performed, then the MFP 1 reserves, as a work area for a file conversion process of the job 5, a memory region 262 having the large size rather than a memory region 261 having the small size which is the actual required size. This is because it is presumed that the facsimile reception is finished shortly and data on the compact PDF is to be created. The MFP 1 uses the memory region 262 having the large size thus reserved to execute the job 5.

Even if the facsimile reception is completed during the execution of the job 5 and execution of a file transmission job (job 6) which requires a work area having the large size is instructed through the automatic transfer function, it is unnecessary to provide a new work area for execution of the job 6 because the memory region 262 having the large size is reserved during the execution of the job 5.

The same operation as the foregoing is performed also for the case where the reception type of the registered automatic transfer is one other than the facsimile through telephone line. In accordance with the registration state of automatic transfer, it is determined whether or not data reception through the LAN 5, data input into a box for the case of box saving, or reception of electronic mail massage is being performed.

Operation Example 4

An example is taken in which a user F accesses the MFP 1 from a remote location. The user F gives a command to execute an Internet facsimile transmission job (job 6) of sending a document saved in the box 20. The user F then gives a command to execute a file transmission job (job 7) of sending a document saved in the box 20. In the job 7, PDF is designated as the file format. The job 6 which is being executed when the job 7 is entered uses the file conversion processing portion 121. The job 7 involving using the file conversion processing portion 121 is therefore in queue.

The user F further gives a command to execute a file transmission job (job 8) of sending a document saved in the box 20. In the job 8, compact PDF is designated as the file format. The entered job 8 is also in a queue as with the job 7 because the job 6 is being executed.

After the execution of the job 6 is completed, execution of the job 7 is started. At this time, the MFP 1 reserves a work area for a file conversion process of the job 7. At this time, the MFP 1 checks whether or not there is a file transmission job to be executed. When finding the job 8 to be executed after the job 7, the MFP 1 checks a required size for a file conversion process of the job 8. When determining that the required size for the job 8 is the large size, the MFP 1 reserves, as a work area for a file conversion process of the job 7, a memory region 262 having the large size rather than a memory region 261 having the small size which is the actual required size. The MFP 1 then uses the memory region 262 having the large size thus reserved to execute the job 7.

According to Operation Example 4, when the execution of the job 8 is started after the completion of the execution of the job 7, it is unnecessary to provide a new work area for execution of the job 8 because the memory region 262 having the large size is reserved during the execution of the job 7.

Operation Example 5

An example is taken in which a user G uses the operating panel 17 to operate the MFP 1, and a user H accesses the MFP 1 from a remote location. Both the user G and the user H are logged-in users successfully authenticated by the MFP 1.

The user G places the document sheet 90 onto the ADF 14, and instructs the MFP 1 to execute a file transmission job (job 9). In the job 9, PDF is designated as the file format. When the user G enters the job 9, a print job (job 10) is already entered by the user H.

When the user G enters the job 9, a print data creation process for the job 10 is being performed. The MFP 1 determines the size of a work area to be reserved for a file conversion process of the job 9. For the determination, the MFP 1 predicts a required time for the print data creation process based on the number of pages or file size for the job 10. It is assumed that the number of pages is 3, the file size is 100 KB, and the required time is 10 seconds. The required time predicted is shorter than a predetermined threshold (30 seconds for example). Since the start time of the execution of the job 10 is known, an estimated finish time of the print data creation process is determined by predicting the required time.

The MFP 1 also predicts a required time for the file conversion process of the job 9 based on processing conditions of the job 9, e.g., the number of pages, color mode, resolution, and image size. It is assumed that the required time is predicted to be 120 seconds since the number of pages is 20, the color mode is a full color mode, the resolution is a high resolution, and the image size is A3 size. The required time thus predicted is longer than a predetermined threshold (30 seconds for example). Since the current time is known from a system clock, an estimated finish time of the file conversion process is determined by predicting the required time.

Since the estimated finish time of the file conversion process of the job 9 is later than that of the print data creation process of the job 10, the MFP 1 reserves, as a work area for the file conversion process of the job 9, a memory region 261 having the small size which is the actual required size. The MFP 1 uses the memory region 261 thus reserved to execute the job 9.

According to Operation Example 5, the memory region 261 having the small size is reserved. This is because if the print data creation process is not performed at the completion of execution of the job 9, even if the next file transmission job has to follow the job 9, a work area necessary for the next file transmission job can be reserved immediately at this point in time.

In the embodiments discussed above, it is possible to achieve predetermined performance of a plurality of processes involving the use of a memory. To be specific, a part of the memory region 25 is provided only in response to a request from the file conversion processing portion 121 (second processing portion). Therefore, when the file conversion processing portion 121 does not use the memory region 25, the print data creation processing portion 111 (first processing portion) uses the entirety of the memory region 25 to advance a print data creation process. In addition, a part of the memory region 25 is provided in accordance with the requested size. Therefore, when the requested size is the small size, the remaining large part of the memory region 25 is used to advance a print data creation process efficiently.

In the embodiments described above, it is possible to prepare three sizes of small, medium, and large as the required size of a work area related to a file conversion process. Even when the required size at this point in time is the small size, if the size predicted to be required next is the medium size, then a work area having the medium size is reserved; and, if the predicted size is the large size, then a work area having the large size is reserved. Even when the required size at this point in time is the medium size, as long as the predicted size is the large size, then a work area having the large size is reserved. If the required size at this point in time is equal to the predicted size, or, alternatively, if the required size at this point in time is larger than the predicted size, then a work area having the required size at this point in time is preferably reserved.

The size of a memory region requested by the file conversion processing portion 121 to the print data creation processing portion 111 is not necessarily equal to the largest size among the required size at this point in time and the predicted size. The size of the requested memory region is preferably a size having at least that largest size, i.e., having the same size as that largest size, or a size larger than that largest size.

In the embodiments discussed above, in the case where a memory region 262 with the large size has been reserved because of a file transmission job in queue, it is possible to return the memory region 262 once depending on the situation. This increases an available memory region for a print process. In the case where, for example, only file transmission jobs of each of which the required size is the small size are entered, and thereby the number of jobs in queue is greater than a predetermined value, the memory region 262 is returned once. Alternatively, whether or not to return the memory region 262 may be determined taking account of the total of the estimated required time of the jobs in queue or the presence/absence of a job involving printing.

The order of making the first prediction, the second prediction, the third prediction, and the fourth prediction in the prediction routine for predicting the next required size is not limited to the order exemplified in FIG. 11, and may be modified appropriately. Even in any order, at the time of the second prediction or beyond, the success or failure of the previous prediction is checked first. If the check result shows that the prediction result is obtained, then the subsequent predictions may be omitted. The processing flow does not always need to include all of the four predictions. Only one, two, or three of the four predictions may be incorporated into the processing flow. In incorporating a plurality of predictions into the processing flow, any combinations thereof may be used.

The method for sharing a memory according to the present invention is applicable also to the case where file format conversion is made to transfer a document from one of boxes in the storage 19 to another box thereof, and to the case where the file format of a document in a box is converted and the resultant is saved into that box.

In the foregoing embodiments, the file conversion module 120 is exemplified as a program for implementing the file conversion processing portion 121. Instead of this, however, the file conversion module 120 may be configured to implement not only the file conversion processing portion 121 but also the predicting portion 211, the state detection portion 212, the frequency obtaining portion 213, and the processing time estimating portion 214.

The file conversion process that is a second process performed by the file conversion processing portion 121 is preferably any one of a plurality of file conversion processes distinguished based on the post-conversion file format, and is not limited to the file conversion process designated by a user. The second process performed by the file conversion processing portion 121 may be, for example, a file conversion process automatically determined in accordance with the automatic transfer settings designated by an administrator, a reception type or a transfer destination of the processing target.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An information device executing a plurality of processes using a memory as a work area in parallel with one another, the information device comprising:
   the memory having a common memory region previously allocated for a first process; and
   a hardware processor that:
      receives a request of at least one of a plurality of second processes, wherein the first process and the plurality of second processes are executed in parallel and a type of the plurality of second processes is different from a type of the first process;
      obtains a first size of a first memory region in the common memory region, wherein the first memory region is requested by a present second process included in the plurality of second processes;
      predicts a second size of a second memory region in the common memory region, wherein the second size is a maximum request size that a next second process to be executed directly after the present second process requires in the second memory region;
      determines which of the first size and the second size is larger; and
      secures a memory region having a predetermined size that is larger than the larger of the first size and the second size determined by the hardware processor for the plurality of second processes before the hardware processor executes the next second process, wherein
   the plurality of second processes are two processes which involve using memory regions having different sizes, and
   the hardware processor further:
      predicts whether the size of the memory region to be required next is a third size or a fourth size larger than the third size;
      estimates, when the present second process is executed, and when the hardware processor receives the request of one of a plurality of second processes, a required time for the present second process; and
      if the required time estimated is equal to or longer than a preset time, determines that the size of the memory region to be required next is the fourth size, and
      if the required time estimated is shorter than the preset time, determines that the size of the memory region to be required next is the third size.

2. The information device according to claim 1, wherein the hardware processor returns the memory region for use by the first process if there is no other of the plurality of second processes to be executed next when said any one of the plurality of second processes is finished.

3. The information device according to claim 1, further comprising:
   an operating panel; and
   a network interface card that connects the information device to a network, wherein
   when at least any one of the operating panel and an external device connected to the information device via the network selects the next second process and when said at least any one of the operating panel and the external device does not give a command to start execution of the next second process, the hardware processor determines that the size of the memory region to be required next is the fourth size.

4. The information device according to claim 1, further comprising:
   an operating panel; and
   a network interface card that connects the information device to a network,
   wherein the hardware processor further obtains a use frequency of the plurality of second processes and a selection frequency of selecting a process which involves using a memory region having the fourth size, the use frequency and the selection frequency being calculated and recorded on a user-by-user basis; wherein
   when at least any one of the operating panel and an external device connected to the information device via the network displays an operating screen for setting a job using one of the plurality of second processes, and when both the use frequency and the selection frequency have values equal to or greater than respective thresholds, the hardware processor determines that the size of the memory region to be required next is the fourth size.

5. The information device according to claim 1, wherein, when the hardware processor is put in an operation mode in which the next second process is automatically executed on process target data sent by the external device, and when the process target data is being received, the hardware processor determines that the size of the memory region to be required next is the fourth size.

6. The information device according to claim 1, wherein the first process is a process for generating raster image data for printing, and
   each of the plurality of second processes is a process for generating data in a designated format.

7. The information device according to claim 1, wherein when the hardware processor executes any one of a plurality of transmission data generation processes by using the provided memory region, a request is made to provide a memory region having at least a larger size of the size predicted by the hardware processor and a size of the memory region which is required at the point in time, and in response to the request, the hardware processor provides a memory region which is a part of the memory region allocated to execute a process for generating raster image data for printing.

8. A non-transitory computer-readable storage medium storing thereon a computer program executed by a hardware processor in an information device executing a plurality of processes using a memory as a work area in parallel with one another, the computer program, when executed by the hardware processor, causes the information device to:

receive a request of at least one of a plurality of second processes, wherein the first process and the plurality of second processes are executed in parallel and a type of the plurality of second processes is different from a type of the first process;

obtain a first size of a first memory region in the common memory region, wherein the first memory region is requested by a present second process included in the plurality of second processes;

predict a second size of a second memory region in the common memory region, wherein the second size is a maximum request size that a next second process to be executed directly after the present second process requires in the second memory region;

determine which of the first size and the second size is larger; and secure a memory region having a predetermined size that is larger than the larger of the first size and the second size determined by the hardware processor for the plurality of second processes before executing the next second process, wherein the plurality of second processes are two processes which involve using memory regions having different sizes, and the computer program further causes the information device to:

predict whether the size of the memory region to be required next is a third size or a fourth size larger than the third size;

estimate, when the present second process is executed, and when the hardware processor receives the request of one of a plurality of second processes, a required time for the present second process; and if the required time estimated is equal to or longer than a preset time, determine that the size of the memory region to be required next is the fourth size, and if the required time estimated is shorter than the preset time, determine that the size of the memory region to be required next is the third size.

9. The non-transitory computer-readable storage medium according to claim 8, wherein the computer program further causes the information device to return the memory region for use by the first process if there is no other of the plurality of second processes to be executed next when said any one of the plurality of second processes is finished.

10. The non-transitory computer-readable storage medium according to claim 8, wherein the information device is a composite information device configured to execute printing and data transmission, when the hardware processor executes any one of a plurality of transmission data generation processes by using the provided memory region a request is made to provide a memory region having at least a larger size of the size predicted by the hardware processor and a size of the memory region which is required at the present point in time, and in response to the request, the hardware processor provides a memory region which is a part of the memory region allocated to execute a process for generating raster image data for printing.

11. A method for sharing a memory comprising a common memory region to execute a plurality of processes comprising a first process and a plurality of second processes in parallel with one another, the method comprising:

receiving a request of at least one of the plurality of second processes, the first process and the plurality of second processes are executed in parallel and a type of the plurality of second processes is different from a type of the first process;

obtaining a first size of a first memory region in the common memory region, the first memory region is requested by a present second process included in the plurality of second processes;

predicting a second size of a second memory region in the common memory region, the second size is a maximum request size that a next second process to be executed directly after the present second process requires in the second memory region;

determining which of the first size and the second size is larger; and securing a memory region having a predetermined size that is larger than the larger of the first size and the second size determined by the hardware processor for the plurality of second processes before executing the next second process, wherein the plurality of second processes are two processes which involve using memory regions having different sizes, and the method further comprises:

predicting whether the size of the memory region to be required next is a third size or a fourth size larger than the third size;

estimating, when the present second process is executed, and when the hardware processor receives the request of one of a plurality of second processes, a required time for the present second process; and if the required time estimated is equal to or longer than a preset time, determining that the size of the memory region to be required next is the fourth size, and if the required time estimated is shorter than the preset time, determining that the size of the memory region to be required next is the third size.

12. The method according to claim 11, further comprising returning the memory region for use by the first process if there is no other of the plurality of second processes to be executed next when said any one of the plurality of second processes is finished.

13. The method according to claim 11, wherein the first process is a process for generating raster image data for printing, and each of the plurality of second processes is a process for generating data in a designated format.

14. The method according to claim 11, wherein the method is used by a hardware processor in a composite information device configured to execute printing and data transmission, when the hardware processor executes any one of a plurality of transmission data generation processes by using the provided memory region a request is made to provide a memory region having at least a larger size of the size predicted by the predicting portion and a size of the memory region which is required at the present point in time, and in response to the request, the hardware processor provides a memory region which is a part of the memory region allocated to execute a process for generating raster image data for printing.

15. An information device executing a plurality of processes using a memory as a work area in parallel with one another, the information device comprising:

the memory having a common memory region previously allocated for a first process; and a hardware processor that:

receives a request of at least one of a plurality of second processes, wherein the first process and the plurality of second processes are executed in parallel and a type of the plurality of second processes is different from a type of the first process;

obtains a first size of a first memory region in the common memory region, wherein the first memory region is requested by a present second process included in the plurality of second processes;

predicts a second size of a second memory region in the common memory region, wherein the second size is a maximum request size that a next second process to be executed directly after the present second process requires in the second memory region;

determines which of the first size and the second size is larger; and secures a memory region having a predetermined size that is larger than the larger of the first size and the second size determined by the hardware processor for the plurality of second processes before the hardware processor executes the next second process, wherein the plurality of second processes are two processes which involve using memory regions having different sizes, and the hardware processor further:

predicts whether the size of the memory region to be required next is a third size or a fourth size larger than the third size;

estimates, when the first process is being executed, when the present second process is executed, and when the hardware processor receives the request of one of a plurality of second processes, a finish time of the first process and a finish time of the present second process; and if the finish time of the present second process estimated is earlier than the finish time of the first process estimated, determines that the size of the memory region to be required next is the fourth size, and if the finish time of the present second process estimated is later than the finish time of the first process estimated, determines that the size of the memory region to be required next is the third size.

16. A non-transitory computer-readable storage medium storing thereon a computer program executed by a hardware processor in an information device executing a plurality of processes using a memory as a work area in parallel with one another, the computer program, when executed by the hardware processor, causes the information device to:

receive a request of at least one of a plurality of second processes, wherein the first process and the plurality of second processes are executed in parallel and a type of the plurality of second processes is different from a type of the first process;

obtain a first size of a first memory region in the common memory region, wherein the first memory region is requested by a present second process included in the plurality of second processes;

predict a second size of a second memory region in the common memory region, wherein the second size is a maximum request size that a next second process to be executed directly after the present second process requires in the second memory region;

determine which of the first size and the second size is larger; and secure a memory region having a predetermined size that is larger than the larger of the first size and the second size determined by the hardware processor for the plurality of second processes before executing the next second process, wherein the plurality of second processes are two processes which involve using memory regions having different sizes, and the computer program, when executed by the hardware processor, cause the information device to further:

predict whether the size of the memory region to be required next is a third size or a fourth size larger than the third size;

estimate, when the first process is being executed, when the present second process is executed, and when the hardware processor receives the request of one of a plurality of second processes, a finish time of the first process and a finish time of the present second process; and if the finish time of the present second process estimated is earlier than the finish time of the first process estimated, determine that the size of the memory region to be required next is the fourth size, and if the finish time of the present second process estimated is later than the finish time of the first process estimated, determine that the size of the memory region to be required next is the third size.

17. A method for sharing a memory comprising a common memory region to execute a plurality of processes comprising a first process and a plurality of second processes in parallel with one another, the method comprising:

receiving a request of at least one of the plurality of second processes, the first process and the plurality of second processes are executed in parallel and a type of the plurality of second processes is different from a type of the first process;

obtaining a first size of a first memory region in the common memory region, the first memory region is requested by a present second process included in the plurality of second processes;

predicting a second size of a second memory region in the common memory region, the second size is a maximum request size that a next second process to be executed directly after the present second process requires in the second memory region;

determining which of the first size and the second size is larger; and securing a memory region having a predetermined size that is larger than the larger of the first size and the second size determined by the hardware processor for the plurality of second processes before executing the next second process, wherein the plurality of second processes are two processes which involve using memory regions having different sizes, and the method further comprises:

predicting whether the size of the memory region to be required next is a third size or a fourth size larger than the third size;

estimating, when the first process is being executed, when the present second process is executed, and when the hardware processor receives the request of one of a plurality of second processes, a finish time of the first process and a finish time of the present second process; and if the finish time of the present second process estimated is earlier than the finish time of the first process estimated, determining that the size of the memory region to be required next is the fourth size, and if the finish time of the present second process estimated is later than the finish time of the first process estimated, determining that the size of the memory region to be required next is the third size.

* * * * *